(12) United States Patent
Weiss et al.

(10) Patent No.: US 11,773,335 B2
(45) Date of Patent: Oct. 3, 2023

(54) HEAT SOURCE FOR PYROLYSIS PROCESS

(71) Applicant: ExxonMobil Technology and Engineering Company, Annandale, NJ (US)

(72) Inventors: Brian M. Weiss, Bridgewater, NJ (US); Sophie Liu, Hampton, NJ (US); Michael R. Harper, Jr., Hillsborough, NJ (US); Herbert W. Barry, Yardville, NJ (US); Changmin Chun, Raritan, NJ (US); Barrington S. Goldson, Easton, PA (US); Justin R. Johnson, Easton, PA (US); Faria Nusrat, Bloomfield, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 17/643,044

(22) Filed: Dec. 7, 2021

(65) Prior Publication Data

US 2022/0235282 A1 Jul. 28, 2022

Related U.S. Application Data

(60) Provisional application No. 63/140,633, filed on Jan. 22, 2021.

(51) Int. Cl.
*C10G 11/12* (2006.01)
*C10G 11/18* (2006.01)

(52) U.S. Cl.
CPC ............ *C10G 11/182* (2013.01); *C10G 11/12* (2013.01); *C10G 2300/703* (2013.01)

(58) Field of Classification Search
CPC ................. C10G 11/12; C10G 11/182; C10G 2300/703; Y02E 50/10; Y02P 20/129
See application file for complete search history.

(56) References Cited

U.S. PATENT DOCUMENTS 7,491,250 B2    2/2009  Hershkowitz et al.
7,815,873 B2 *  10/2010 Sankaranarayanan .... C07C 1/24
                                                                422/223

(Continued)

FOREIGN PATENT DOCUMENTS

WO     2018/044547 A1   3/2018
WO     2018/0440555 A1  3/2018

OTHER PUBLICATIONS

Froment, Gilbert F., Kenneth B. Bischoff, and Juray De Wilde Chemical reactor analysis and design. vol. 2 New York: Wiley, 1990. p. 403.

*Primary Examiner* — In Suk K C Bullock
*Assistant Examiner* — Jason Y Chong
(74) *Attorney, Agent, or Firm* — SHOOK, HARDY & BACON L.L.P.

(57) ABSTRACT

Systems and methods are provided for using a reverse flow reactor (or another reactor with flows in opposing directions at different parts of a process cycle) for pyrolysis of hydrocarbons. The systems and methods can include a reactor that includes a combustion catalyst to initiate and/or maintain combustion within the reactor in a controlled manner during the heating and/or regeneration portion(s) of the reaction cycle. A fuel can also be used that has a greater resistance to auto-combustion, such as a fuel that is composed primarily of methane and/or other hydrocarbons. During operation, the temperature in at least an initial portion of the reactor can be maintained at a temperature so that auto-ignition of the auto-combustion resistant fuel injected during the heating step(s) is reduced or minimized. This can allow combustion to be initiated when the auto-combustion resistant fuel comes into contact with the catalyst. Additionally, the amount and positioning of the catalyst within the reactor can be controlled so that combustion of the fuel takes place over a substantially longer period of time than combustion during (Continued)

a conventional reactor heating step. Because the fuel is moving within the reactor during combustion, extending the combustion time results in a substantial expansion of the volume where combustion occurs. Optionally in combination with an improved reaction cycle, this can expand the portion of the reactor that is directly heated by combustion, allowing for an improved temperature distribution within the reactor during the pyrolysis step.

20 Claims, 12 Drawing Sheets

(56) References Cited

U.S. PATENT DOCUMENTS

| | | | |
|---|---|---|---|
| 8,754,276 B2 * | 6/2014 | Buchanan | C07C 5/415 585/407 |
| 9,499,457 B2 | 11/2016 | Hershkowitz et al. | |
| 9,809,506 B2 | 11/2017 | Hershkowitz et al. | |
| 2004/0076562 A1 * | 4/2004 | Manzanec | B01J 35/0006 422/600 |
| 2007/0144940 A1 | 6/2007 | Hershkowitz et al. | |
| 2007/0191664 A1 | 8/2007 | Hershkowitz et al. | |
| 2008/0142409 A1 | 6/2008 | Sankaranarayanan et al. | |

* cited by examiner

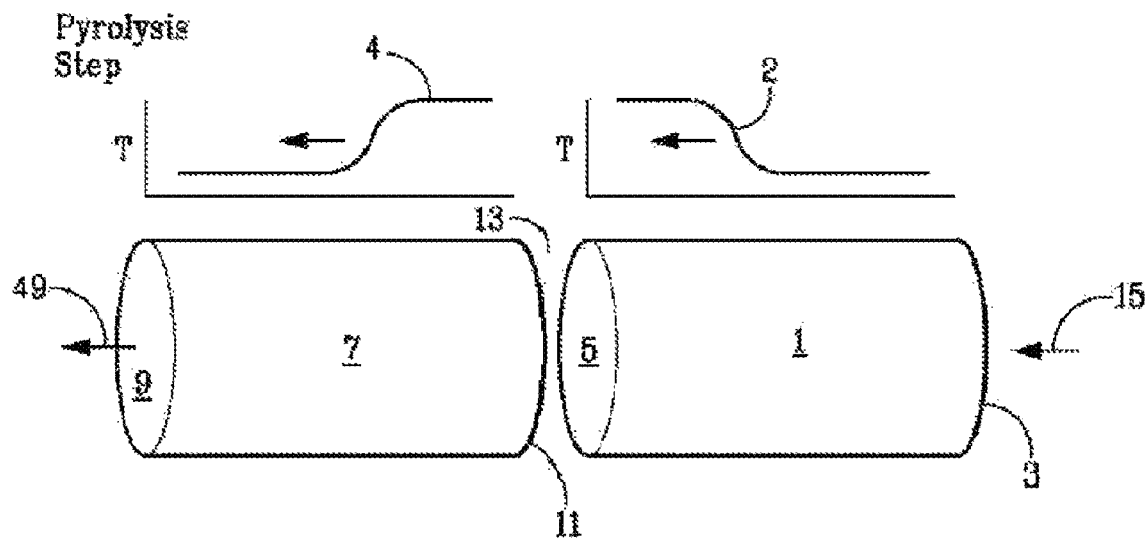
FIG. 1A
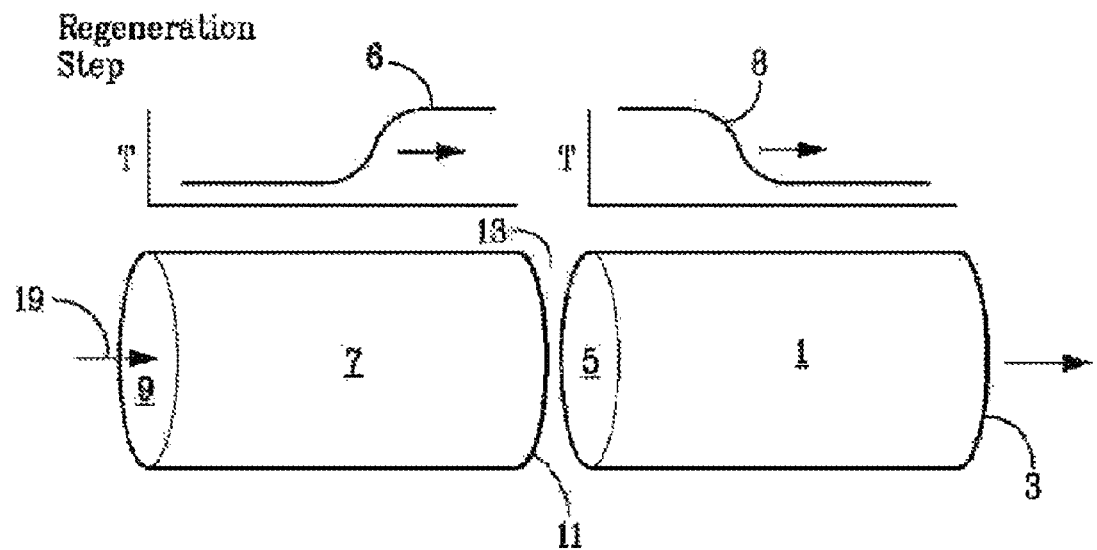
FIG. 1B
FIG. 1

HEAT SOURCE FOR PYROLYSIS PROCESS

CROSS-REFERENCE TO RELATED APPLICATIONS

This application claims the benefit of priority to U.S. Provisional Application No. 63/140,633 filed Jan. 22, 2021, which is hereby incorporated by reference in its entirety.

FIELD OF THE INVENTION

This invention relates to systems and methods for providing heat for high temperature endothermic processes in a cyclic flow reaction environment, such as a reverse flow reactor.

BACKGROUND OF THE INVENTION

Reverse flow reactors are an example of a reactor type that is beneficial for use in processes with cyclic reaction conditions. For example, due to the endothermic nature of pyrolysis reactions, additional heat needs to be introduced on a consistent basis into the pyrolysis reaction environment. Reverse flow reactors can provide an efficient way to introduce heat into the reaction environment. After a portion of the reaction cycle used for pyrolysis or another endothermic reaction, a second portion of the reaction cycle can be used for combustion or another exothermic reaction to add heat to the reaction environment in preparation for the next reforming step. U.S. Pat. Nos. 7,815,873, 9,499,457, and 8,754,276 provide examples of using reverse flow reactors to perform various endothermic processes in a cyclic reaction environment.

One of the difficulties with pyrolysis of hydrocarbons is that pyrolysis is an endothermic reaction that requires temperatures of 1000° C. or more to occur at desirable rate. Providing sufficient heat to a reaction environment to maintain this temperature is difficult to do without substantial loss of waste heat. Use of a cyclic flow reaction environment, such as a reverse flow reactor, can reduce the amount of energy lost as waste heat. However, the amount of combustion that can be conventionally performed within the reaction environment during a regeneration cycle is constrained by material temperature limits and the nature of combustion reactions. Thus, it would be desirable to have improved systems and methods for providing heat to a pyrolysis reaction environment.

U.S. Pat. Nos. 9,499,457 and 9,809,506 describe systems and methods for pyrolysis of hydrocarbons to form ethylene. The pyrolysis is described as being performed at higher pressures in order to provide reduced energy consumption while also providing improved yield of ethylene.

U.S. Pat. No. 8,754,276 describes systems and methods for performing endothermic reactions, such as propane dehydrogenation, in a reverse flow reactor. The systems include a first zone for performing combustion to regenerate the reactor, and a second zone for performing the desired endothermic reaction. The systems include a combustion catalyst at or near the end of the first zone. For reactions operated at higher temperatures, such as steam reforming, the fuel is described as auto-combusting prior to reaching the combustion catalyst bed. The catalyst bed is described as being useful for initiating combustion when the endothermic reaction is performed at lower temperatures, such as operating at 700° C. for propane dehydrogenation.

International Publications WO 2018/044547 and WO 2018/0440555 describe methods for performing pyrolysis in a reverse flow reactor, where improved performance is achieved by controlling the open frontal area of at least a portion of the thermal mass used for heat transfer in the reactor.

SUMMARY OF THE INVENTION

In an aspect, a method for performing pyrolysis is provided. The method includes exposing a fuel stream comprising fuel and oxygen in a reactor to a catalyst system comprising a catalyst density gradient of combustion catalyst under combustion conditions to form a flue gas and to heat one or more surfaces in a reaction zone to a surface temperature of 750° C. or more. The one or more surfaces in the reaction zone can have a peak temperature of 1000° C. or less. The fuel can correspond to 90 vol % $CH_4$ or more. The fuel stream can flow in the reactor in a first flow direction. The method further includes exposing a hydrocarbon-containing stream to the one or more surfaces in the reaction zone to pyrolyze at least a portion of the hydrocarbon-containing stream to form a pyrolyzed product. A flow direction of the hydrocarbon-containing stream can correspond to a second flow direction that is substantially opposite to the first flow direction.

In another aspect, a reactor for performing cyclic reactions with flows entering the reactor from substantially opposing directions is provided. The reactor can include a first reactor inlet and a first reactor outlet. The reactor can further include a reaction zone that includes a catalyst system. The catalyst system can have a catalyst density gradient of combustion catalyst. The catalyst density gradient of combustion catalyst can include at least a first portion of combustion catalyst having a first combustion catalyst density and a second portion of combustion catalyst having a second combustion catalyst density, the second portion having a greater combustion catalyst density than the first portion of combustion catalyst. The first reactor inlet can be closer to the first portion of combustion catalyst than the second portion of combustion catalyst.

Optionally, the reaction zone can further include an additional portion of combustion catalyst having a greater combustion catalyst density than the second portion of combustion catalyst, the first reactor inlet being closer to the second portion of combustion catalyst than the additional portion of combustion catalyst. Optionally, the second combustion catalyst density can be greater than the first combustion catalyst density by 50% or more relative to the first combustion catalyst density.

Optionally, the reactor can further include a second reactor inlet. In such an optional aspect, the catalyst system can further include a third portion of combustion catalyst having a third combustion catalyst density, the second portion of combustion catalyst being located between the first portion of combustion catalyst and the third portion of combustion catalyst, the second portion of combustion catalyst having a greater combustion catalyst density than the third portion of combustion catalyst. In such an optional aspect, the second reactor inlet can be closer to the third portion of combustion catalyst than the second portion of combustion catalyst.

BRIEF DESCRIPTION OF THE DRAWINGS

FIG. 1 shows an example of operation of a reverse flow reactor. FIG. 1A shows the pyrolysis step of the reverse flow cycle. FIG. 1B shows the regeneration step of the reverse flow cycle.

DETAILED DESCRIPTION OF THE EMBODIMENTS

Figure 2:
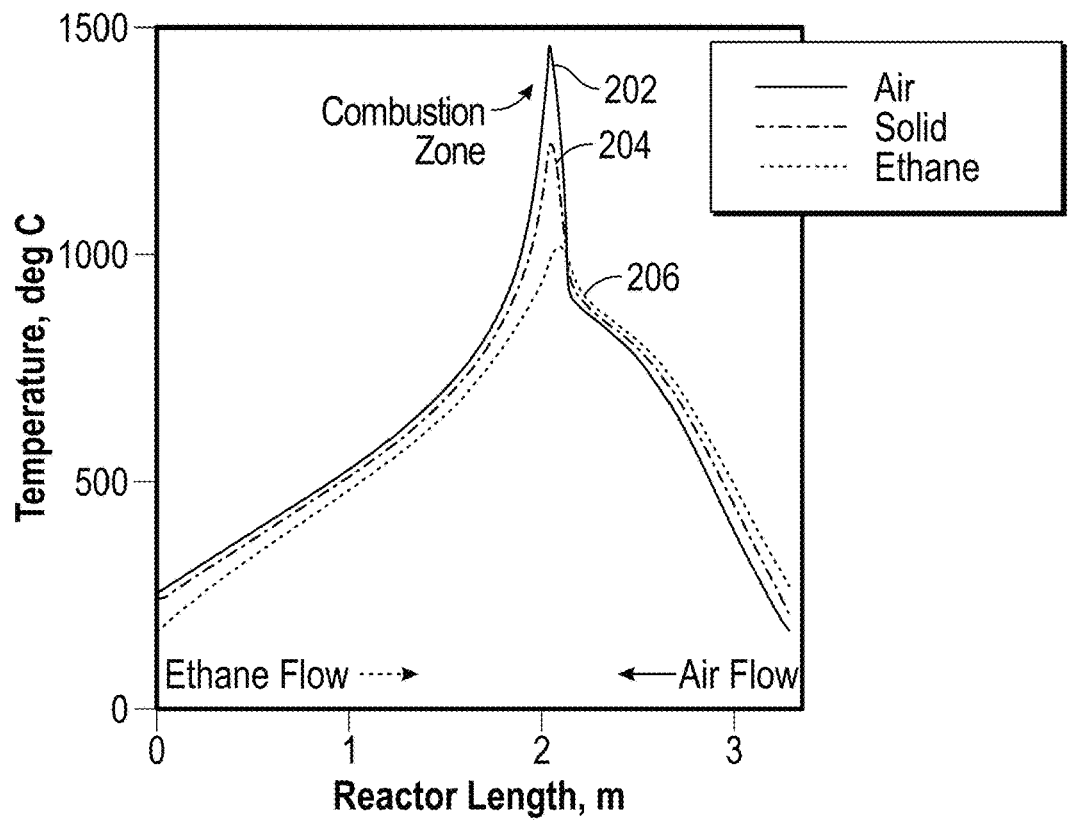
FIG. 2 shows various temperatures within a reactor based on modeling of a cyclic pyrolysis process with a combustion time of 6 milliseconds during the combustion step.

All numerical values within the detailed description and the claims herein are modified by "about" or "approximately" the indicated value, and take into account experimental error and variations that would be expected by a person having ordinary skill in the art.

Overview

In various aspects, systems and methods are provided for using a reverse flow reactor (or another reactor with flows in opposing directions at different parts of a process cycle) for pyrolysis of hydrocarbons. The systems and methods can include a reactor that includes a combustion catalyst to initiate and/or maintain combustion within the reactor in a controlled manner during the heating and/or regeneration portion(s) of the reaction cycle. A fuel can also be used that has a greater resistance to auto-combustion, such as a fuel that is composed primarily of methane and/or other hydrocarbons. During operation, the temperature in at least an initial portion of the reactor can be maintained at a temperature so that auto-ignition of the auto-combustion resistant fuel injected during the heating step(s) is reduced or minimized. This can allow combustion to be initiated when the auto-combustion resistant fuel comes into contact with the catalyst. Additionally, the amount and positioning of the catalyst within the reactor can be controlled so that combustion of the fuel takes place over a substantially longer period of time than combustion during a conventional reactor heating step. Because the fuel is moving within the reactor during combustion, extending the combustion time results in a substantial expansion of the volume where combustion occurs. Optionally in combination with an improved reaction cycle, this can expand the portion of the reactor that is directly heated by combustion, allowing for an improved temperature distribution within the reactor during the pyrolysis step. For example, in some aspects, a reaction cycle can be performed that allows the gas flows for both heating and pyrolysis to be introduced from both ends of the reactor at various times during the cycle. By using a combination of i) a combustion catalyst distributed through a combustion volume, ii) an auto-combustion resistant fuel, iii) a temperature that reduces or minimizes auto-ignition, and/or iv) a multiple heating step reaction cycle, a temperature profile with improved temperature uniformity can be achieved. This can reduce or minimize the peak temperature that the reactor is exposed to during pyrolysis while still providing sufficient heat to perform pyrolysis at a commercially desirable rate.

Conventionally, pyrolysis can be performed using a method that involves indirect heating of the feed for pyrolysis. For example, small diameter reaction tubes can be placed within a furnace environment. The interior of the furnace is heated using fired heaters, while additional heat can also be transferred into the feed for pyrolysis prior to entering the furnace. This indirect heating method allows the feed to be heated to the desired pyrolysis temperature within the small diameter reaction tubes without exposing the feed for pyrolysis to the combustion environment. The pyrolysis reaction within the reaction tubes is performed at elevated temperatures of 750° C. or more for relatively short reaction times (roughly 0.5 seconds or less) and at relatively low total pressures of 30 psig or less (roughly 200 kPag or less).

While indirect heating can be used to perform pyrolysis, a substantial amount of excess heat is lost as waste heat during operation. For example, conversion of ethane, naphtha, and/or other hydrocarbon fluids to ethylene by pyrolysis is an endothermic process with a reaction enthalpy of roughly 4-5 GJ per ton of olefin. Due to practical limitations on designs for indirect heating, however, the amount of fuel that has to be combusted in the furnace (and for pre-heating of the pyrolysis feed) corresponds to roughly 15 GJ per ton of olefin or more. Thus, the amount of fuel required to perform pyrolysis by such indirect heating methods can be more than three times the reaction enthalpy. In commercial scale designs, efforts are typically made to recover a portion of this excess heat, such as by using the excess heat to raise steam for electric power generation. Unfortunately, the pyrolysis products need to be quenched rapidly after pyrolysis to preserve the desired reaction products. In combination with other practical limitations on conversion of waste heat to other forms of power, the amount of waste heat that can be successfully recovered during power generation with condensing steam turbines while also performing olefin recovery is typically less than 40%, or less than 30%.

Some other inefficiencies of using fired pyrolysis heaters for indirect heating of a pyrolysis reaction can include 1) the need for many reactor tubes, which increases cost and complexity, 2) large size of the furnaces, which also increases cost, 3) the potential for upsets due to non-uniform heating or fouling of the tubes, requiring fast interventions to maintain the structural integrity of the reaction tubes, and 4) high NOx emissions due to high flame temperatures, requiring expensive ammonia reduction systems to meet emissions standards.

Using a reverse flow reactor (RFR) to perform pyrolysis (or more generally, another reactor that can introduce flows from opposing directions) can overcome some limitations of a fired pyrolysis heater. In an RFR, heat is generated at or near the center of a packed bed. The mechanism for heat transfer is convection from the packing to the hydrocarbon. In an RFR, heat exchange is more effective than in a fired pyrolysis heater, so the reaction is quenched by preheating the feed, which allows much better heat recuperation. As a result, the heat duties in an RFR are below 6 GJ per ton of olefins, which is less than half of the heat duty of a conventional pyrolysis furnace. The reactor design is also simpler as separate reactor tubes are not needed. Instead, the same volume within the reactor can be used for both combustion of fuel and pyrolysis of a hydrocarbon feed. The combustion and pyrolysis reactions are separated by time rather than being located in separate volumes.

Although use of an RFR can reduce the heating requirements for performing pyrolysis, challenges remain in using an RFR (or other reactor with flows entering from opposing directions) to perform pyrolysis. Some of these challenges are related to operation of the combustion or heating step during a reaction cycle for pyrolysis. First, sufficient heat needs to be generated to maintain the temperatures that are needed for pyrolysis. During RFR operation, this means combustion of fuel. Second, the fuel needs to be combusted at roughly the same location in the reactor during each cycle, so that a stable temperature profile is produced that can allow for consistent operation during each reaction cycle. Third, it is desirable for the combustion step to achieve substantially complete combustion of the fuel. Fourth, although elevated temperatures need to be generated, it is also desirable to minimize the peak temperature, in order to reduced coke formation and/or fatigue in the reactor.

From a practical standpoint, achieving the desired temperature for pyrolysis is required, since the pyrolysis reaction cannot otherwise be performed. In order to maintain a repeatable process, achieving combustion at substantially the same location during each cycle is also needed. Additionally, in order to avoid the need for substantial extra processing equipment for the resulting flue gas, achieving substantially complete combustion is also a practical requirement. Unfortunately, conventional solutions that allow the above features to be achieved result in a temperature profile within the reactor that includes a large temperature spike at or near the combustion location. This spike can be mitigated somewhat by adding diluent gas to the flow during the combustion step. However, the uneven distribution of heat within the RFR can result in detrimental hot spots that cause coking and/or degradation of packing materials.

In various aspects, improved control over the temperature profile during hydrocarbon pyrolysis in an RFR (or other reactor with flows introduced in opposing directions) by using an advantageous arrangement of a combustion catalyst within the RFR. The arrangement of catalyst is used in combination with an auto-combustion resistant fuel and desirable operating conditions so that auto-ignition of the fuel is reduced or minimized. This can extend the time period when the combustion reaction occurs while still providing reliable combustion of fuel within a desired region of the reactor. Since the fuel and oxidant are moving within the RFR, the increase in combustion time also results in an increase in the spatial volume where combustion occurs.

In order to expand the combustion time and/or the spatial volume where combustion occurs, instead of having the fuel and oxidant for combustion encounter a high concentration of combustion catalyst at the beginning of the catalyst bed, a catalyst system can be used that has a density gradient of combustion catalyst. The catalyst system can include, for example, one or more types of combustion catalyst in combination with one or more types of substantially inert material. The density gradient in catalyst concentration can be achieved by mixing the combustion catalyst(s) with varying amounts of the substantially inert material(s). The density gradient can allow the combustion reaction to proceed at a substantially slower pace. As the fuel and oxidant progress within the reactor, higher concentrations of combustion catalyst can be used so that substantially complete combustion of the fuel is achieved. By spreading out the combustion reaction across a larger volume, the peak temperature within the reactor can be substantially reduced while still providing sufficient thermal energy to perform pyrolysis.

In some aspects, further improvements in the temperature profile within a reactor can be achieved by using a reaction cycle where, at different points in the reaction cycle, fuel and pyrolysis feedstock are introduced into the reactor from both ends of the reactor. In some conventional reaction cycles, the fuel and oxidant for combustion are introduced into an RFR from one end of the reactor during a combustion step in the reaction cycle, while the feedstock for pyrolysis during the pyrolysis step is introduced from the opposite end of the reactor. In contrast to this type of operation, a reaction cycle can be used that includes multiple combustion and pyrolysis steps within the reaction cycle. This can allow combustion to be performed based on fuel flows entering at both ends of the reactor at different times in the reaction cycle. Similarly, feedstock for pyrolysis can be introduced from both ends of the reactor at different times during the reaction cycle. The ability to introduce fuel for combustion and/or feedstock for pyrolysis from both directions during different steps in the reaction cycle can allow for further improvements in the steady state temperature profile within the reactor.

Operating an RFR with an expanded spatial volume for combustion (achieved in part by expanding the time for combustion) can provide a variety of advantages. Relative to a conventional fired heater system for indirect heating of reaction tubes, an RFR can provide reductions in total combustion of 50% or more, or 60% or more. Since a conventional fired heater can recover some of this excess heat, the net energy savings can 20% or more, or 25% or more. Additionally, operating an RFR with an expanded spatial volume for combustion can provide advantages relative to a conventional RFR configuration for pyrolysis, where auto-combustion would be used. Such advantages can include, but are not limited to, increased cycle length, 2) lower temperatures for surfaces and/or heat transfer solids in the reactor (which reduces coking), 3) smaller swing in temperatures for surfaces and/or heat transfer solids, thereby reducing thermal stress on materials, 4) reduced steam used during purging of the reactor between cycles, and/or 5) lower NOx emissions (due in part to the reduced peak temperatures within the reactor).

Fuel for Reduced Auto-Combustion

In various aspects, a fuel can be used for combustion that has a reduced or minimized tendency to undergo auto-combustion under the conditions present in an RFR reactor being operated for hydrocarbon pyrolysis. The fuel can correspond to, for example, a fuel where the majority of the heating value in the fuel is provide by methane.

One option for characterizing a fuel can be based on the volume percentage of fuel components in the fuel. Fuel components are defined as components that can undergo substantially complete combustion in the presence of a combustion catalyst when a sufficient amount of oxidant is present in a pyrolysis reactor. For example, although small amounts of $N_2$ can be converted to NOx when combustion is performed within a pyrolysis reactor, the substantial majority of $N_2$ will remain unreacted. (Significantly higher temperatures would be needed in order to achieve substantially complete combustion of $N_2$.) Thus, $N_2$ is not considered a fuel component under this definition. Generally, fuel components can correspond to $H_2$, CO, hydrocarbons, and various types of hydrocarbon-like components. It is further noted that any oxidant is also excluded from the definition of a fuel component, as the oxidant concentration in an input flow is separately specified.

In some aspects, a fuel that is resistant to auto-combustion can correspond to a fuel where 90 vol % or more of the fuel components in the fuel correspond to methane, or 95 vol % or more, or 98 vol % or more, such as up to having substantially all of the fuel components in the fuel correspond to methane. In some aspects where the fuel components include 1.0 vol % or more of ethane, ethylene or propane and/or 1.0 vol % or more of a $C_{3+}$ hydrocarbon, the fuel components can include 95 vol % to 99 vol % of methane, or 98 vol % to 99 vol %. Optionally, the fuel components can include 1.0 vol % or less of $H_2$, such as down to including substantially no $H_2$.

It is noted that the input flows to an RFR during a combustion or heating step can also include substantially inert components to facilitate heat transport within a reactor, such as $N_2$, $CO_2$, and/or $H_2O$. These inert components can be introduced as part of the fuel, as part of an oxidant flow, as part of a separate diluent flow, or in any other convenient manner. Thus, if diluents are present with the fuel flow and/or if a separate diluent flow is introduced, it is understood that the concentration of methane in the "fuel" flow may be less than 90 vol %, as a portion of the inert components introduced into the combustion step may be introduced as part of the fuel flow. Additionally, the oxidant for performing the combustion reaction may also be introduced as a separate flow or as part of the fuel flow. As a result, defining the concentration of methane in the fuel based on the vol % of fuel components can simplify the description of the fuel, as the vol % of methane relative to the fuel components is independent of how the oxidant and additional inert components are introduced into the reactor.

In some aspects, the input flows for the combustion or heating step can include a reduced or minimized amount of inert components. In such aspects, air can still be used as the source of oxygen ($O_2$), but the amount of additional diluent introduced into the reactor during combustion or heating can be reduced or minimized. For example, in such aspects, the oxidant flow can include 15 vol % $O_2$ or more (such as up to using substantially pure $O_2$ from a air separation unit); the fuel flow can include 90 vol % or more of fuel components; and/or the flow volume of any separate diluent flows can correspond to 10 vol % or less of the total flow volume during the combustion or heating step. Additionally or alternatively, the combined streams introduced into the RFR during the heating or combustion step can be referred to as a fuel stream, and the fuel stream can include 90 vol % or more (or 95 vol % or more) of fuel and air, with the air having an $O_2$ content of 15 vol % or more. This type of low diluent operation during combustion can be in contrast to the diluent content during a RFR heating step when auto-combustion is used. When auto-combustion is used, excess diluent is typically used to assist with transporting heat from the localized combustion into a greater portion of the reactor volume. When using a catalyst system with a catalyst density gradient, a superior expansion of volume can be achieved by spreading out the volume of combustion. This can allow the problems associated with introducing excess diluent to be reduced, minimized, or avoided.

During combustion, a sufficient amount of oxidant can be introduced into the reactor to provide an excess of oxidant relative to the amount needed for stoichiometric combustion of the fuel. In various aspects, the amount of excess oxidant can correspond to an amount that is 1 mol % or more greater than the stoichiometric amount, or 10 mol % or more greater, or 20 mol % more greater, such as up to 99 mol % or more greater or possibly a still larger amount. In other aspects, a substantially stoichiometric amount of oxidant can be used. $O_2$ is an example of a suitable oxidant. In some aspects, $O_2$ can be introduced into the reactor by introducing air or a stream derived from air into the reactor. It is noted that while still greater amounts of $O_2$ can be used, such additional excess $O_2$ can serve primarily as a diluent gas once sufficient $O_2$ is available to minimize gas flow limitations on combustion. In other aspects, $O_2$ from any convenient source can be used, such as an $O_2$-containing stream generated by an air separation unit. It is noted that in aspects where a relatively high purity $O_2$ stream is used, addition of diluent may be desirable in order to reduce the auto-combustion temperature within the reactor.

During a combustion step, the combustion products generated by combustion of an auto-combustion resistant fuel can be flowed downstream to a combustion heat transfer zone (e.g., a portion of the first and/or second zone proximate to the thermal mass) with thermal mass located in the combustion heat transfer zone absorbing heat produced from the combustion of the combustion streams. This absorbed heat by the material in combustion heat transfer zone is sufficient to enable pyrolysis of the hydrocarbon stream (e.g., hydrocarbons in the pyrolysis feed) that flow through the pyrolysis preheat zone (e.g., a portion of the first and/or second zone of thermal mass) in the pyrolysis step, which is carried out in a flow direction that is the reverse of the flow direction of the combustion step. The combustion heat may also be sufficient to enable coke or tar components that may have accumulated in the combustion heat transfer zone during a previous pyrolysis step to be burned, thereby regenerating the combustion heat transfer zone. This heating and regeneration of the heating step is particularly beneficial in a cyclic process that incorporates both the heating step and the pyrolysis step.

Catalyst System for Fuel Combustion

In various aspects, a catalyst system can be used to facilitate combustion of fuel within an RFR reactor in an expanded spatial volume. The catalyst system can include both combustion catalyst and substantially inert material, so that a density gradient of combustion catalyst can be achieved along the direction of flow of fuel and oxidant within the reactor.

In order to perform pyrolysis, a temperature of 750° C. or more needs to be achieved within a reactor. However, temperatures of 800° C. or more are sufficient to initiate self-sustaining auto-combustion of fuel in the presence of an oxidant, even when the fuel is an auto-combustion resistant fuel where 90 vol % or more of the fuel components correspond to methane. In conventional RFR systems operated for pyrolysis, auto-combustion of fuel is used during the combustion or regeneration step(s) in a reactor.

One of the difficulties with auto-combustion is that the combustion reaction proceeds rapidly, resulting in a large temperature spike at the location in the reactor where the auto-combustion occurs. This location can be controlled based on temperature profile and/or by keeping the fuel components separate from the oxidant until combustion is desired. But this only changes the position of the temperature peak within the reactor.

Under pyrolysis conditions, having a substantial temperature spike in the reactor temperature profile can cause a variety of issues. Since temperatures of 750° C. or more are desirable for performing pyrolysis, having a temperature spike within the temperature profile can result in a peak temperature of 1000° C. or more in the reactor. Having a location with such an increased temperature can result in increased coke formation within the reactor. Additionally, having an elevated temperature and/or larger temperature swings places addition stress on the reactor components.

Combustion catalyst has been used within an RFR reactor in configurations for performing a reaction with a maximum temperature of roughly 700° C. or less. For such reactions, the temperature within the reactor might not be sufficient to fully combust fuel via auto-combustion. The addition of combustion catalyst has been used to rapidly combust fuel for such reactions. This again results in a temperature profile with a substantial temperature spike at the combustion location. Thus, simply using a combustion catalyst within an RFR reactor does not mitigate the presence of a temperature spike in the temperature profile.

In order to generate an improved temperature profile, in various aspects a catalyst system including combustion catalyst can be used so that flows of fuel and oxidant within the reactor encounter a gradient of catalyst density. The catalyst system can be arranged so that the first contact of fuel with catalyst can occur with a relatively low density of catalyst. This initial low density of catalyst in the catalyst system can be sufficient to combust a portion of the fuel. The catalyst density can then be ramped up according to any convenient pattern. The catalyst density can be increased a sufficient amount so that, at or near the center of the catalyst system, sufficient catalyst density is present to achieve substantially complete combustion of any remaining fuel in the fuel flow.

In some aspects, a catalyst system with a continuous gradient of catalyst density can be used. In other aspects, the catalyst density can be increased in a stepwise manner, so that a plurality of catalyst densities are present at different locations within the catalyst system. In aspects where fuel flows are introduced from both directions within the reactor, the catalyst density gradient can correspond to a peak at or near the middle of the catalyst system, with lower amounts at both ends of the catalyst system. The catalyst density gradient can be symmetric, or different gradient patterns can be used on either side of the middle of the catalyst system. In some aspects, the catalyst system can include at least a first portion and a second portion, with the second portion having a second catalyst density that is greater than the first catalyst density of the first portion by 50% or more (relative to the catalyst density of the first portion).

To illustrate a catalyst density gradient, a catalyst system including combustion catalyst can be loaded into a reactor as catalyst particles that are contained in compartments. In this type of example, an initial portion of the catalyst system can correspond to having compartments containing 20 vol % or less of combustion catalyst, or 10 vol % or less, or 5.0 vol % or less, with the balance of the particles corresponding to substantially inert particles. A second, downstream set of compartments can include 40 vol % or less of catalyst particles, or 30 vol % or less, or 20 vol % or else, with the balance corresponding to substantially inert particles. A third set of compartments can then include 60 vol % or more of catalyst particles, or 80 vol % or more, such as up to having 100 vol % of catalyst particles in the third set of compartments. If fuel flows are introduced from both directions during operation, additional compartments (such as a fourth set of compartments and a fifth set of compartments) can be used to reduce the catalyst density in a similar way to the catalyst density increase provided in the first compartments through third compartments. This can result in the peak catalyst density occurring at or near the middle of the catalyst system. More generally, any convenient number of catalyst density changes can be included in a catalyst system. It is noted that this example uses catalyst particles for convenience in describing the concept of a catalyst density gradient. Any other convenient method of achieving a catalyst density gradient could also be used, such as coating only a portion of the channels in a section of a monolith and/or varying the catalyst content within a washcoat that is applied to a monolith.

In various aspects, the combustion catalyst used in the catalyst system can correspond to catalysts that include one or more of Mn, Y, Pd, and/or Pt as the metal for catalyzing combustion. Optionally, a combustion catalyst can also include a promoter metal, such as Mg, Ca, or another alkaline earth metal. In some aspects, the combustion catalyst can correspond to a supported catalyst, where the catalytic metal and the optional promoter are supported on a refractory support. Alumina is an example of a suitable support material. For catalysts where more than one catalytic metal is used, the molar ratio of a first catalytic metal to a second catalytic metal can be between 0.1 and 10. It is noted that the catalytic metal may be present in oxide form in the catalyst. The amount of combustion catalyst can vary depending on the nature of the catalyst and the catalyst configuration. Generally, the peak amount of catalyst in the catalyst density gradient can correspond to a conventional concentration for achieving substantially complete combustion of a fuel under high temperature conditions. For example, in an aspect where the combustion catalyst is applied to a monolith as a washcoat, the peak of the catalyst density gradient can correspond to having a catalyst density of 0.05 g/L to 2.0 g/L within the monolith structure. It is noted that this catalyst density is based on the weight of the catalyst (Pt, Pd, manganese oxide), and is not based on the total weight of the catalyst particles (which might also include binders, supports, or other materials). Other portions of the monolith and/or other monoliths used to form the catalyst density gradient can then have relatively lower catalyst densities.

In order to achieve a catalyst density gradient, a portion of a catalyst system can correspond to substantially inert material. For example, when the catalyst system includes combustion catalyst particles, a portion of the particles in the catalyst system can correspond to substantially inert particles. Examples of suitable substantially inert materials include alumina and/or silica (such as quartz).

Reaction Cycle and Temperature Profile

Without being bound by any particular theory, by using an auto-combustion resistant fuel in combination with a catalyst system having a suitable catalyst density gradient, it is believed that the length of time from initiation of combustion to substantial completion of combustion of fuel introduced into the reactor can be increased. Additionally or alternately, the spatial volume required for substantially complete combustion (relative to the location where combustion is initiated) can be increased. Whether due to increased combustion time or increased spatial volume, the modification of the combustion characteristics can allow for an improved temperature profile, so that the temperature within a reactor is high enough to perform pyrolysis while reducing or minimizing the peak temperature within the reactor.

A goal of a reaction cycle for performing pyrolysis can be to have a reaction cycle that provides a temperature of 750° C. or more, or 800° C. or more, or 850° C. or more, in a pyrolysis zone with a peak temperature in the reactor of 1000° C. or less, or 950° C. or less, or 900° C. or less, or 875° C. or less. In order to achieve this type of profile, in some aspects the fuel and oxidant used during the combustion step(s) of the reaction cycle can be maintained at a temperature of 750° C. or less prior to exposure to the combustion catalyst. In other aspects, the fuel and oxidant can be exposed to temperatures of 750° C. to 900° C. (or 750° C. to 850° C.) for a limited time period prior to exposure to the combustion catalyst, such as exposing the fuel and oxidant to a temperature of 750° C. to 900° C. (or 750° C. to 850° C.) for 50 msec or less, or 30 msec or less, prior to exposure to the combustion catalyst. By maintaining the fuel and oxidant at a sufficiently low temperature (and/or minimizing the exposure to an elevated temperature), the onset of combustion can be delayed until the fuel and oxidant flow(s) encounter the combustion catalyst. This can allow for greater control over the combustion profile.

It is noted that the combustion catalyst can be partially or fully included in the pyrolysis zone. In some aspects, the initial exposure of the fuel stream to the combustion catalyst can be at a temperature of 720° C. or more. In other words, the first portion of the catalyst system (farthest upstream relative to the gas flow) can be at a temperature of 720° C. or more when contacted with the fuel. For example, at the start of a combustion step, the temperature of the catalyst system can be at a minimum. At this stage in the reaction cycle, the initial portion of the catalyst system can be at a temperature that is below 750° C. In some aspects, it is desirable for the initial portion of the catalyst system to be at a temperature of 720° C. or more at this stage in the reaction cycle. It is noted that in some aspects, fuel and oxygen are introduced into the reactor from both directions. In such aspects, the "initial" portion of the catalyst system is relative to the direction of gas flow for the fuel and oxidant.

The pressure of the fuel in the reactor can also be maintained at a sufficiently low level to reduce or minimize auto-combustion. The tendency for a fuel to undergo auto-combustion increases with increasing fuel pressure. In various aspects, the total pressure in the reactor during combustion can be maintained at 300 kPa-a or less, or 200 kPa-a or less, such as down to 100 kPa-a or possibly still lower.

One option for achieving a desired temperature profile in a RFR is using a reaction cycle where the flow(s) for the combustion portion of the reaction cycle enter the reactor from the opposite direction of the flow(s) for the pyrolysis portion of the reaction cycle. When using this type of reaction cycle, the catalyst system can include a catalyst density gradient so that the catalyst density increases in the direction of the flow of fuel during the combustion step of the reaction cycle. In addition to a combustion step and a pyrolysis step, one or more purge steps can be included to avoid mixing of the reaction products from the combustion step and the pyrolysis step. For example, a first step can be included after the combustion step, while a second purge step can be included after the pyrolysis step.

Another option can be to use a reaction cycle where, at different steps in the reaction cycle, flows for combustion can be introduced from both ends of the reactor and flows for pyrolysis can be introduced from both ends of the reactor. In such aspects, a catalyst system can be used that include a peak of catalyst at or near the middle, with decreasing catalyst density in both directions. In addition to combustion steps and pyrolysis steps, purge steps can also be included in the reaction cycle.

Example of Reactor Configuration

The pyrolysis reaction of this invention can be carried out in any reactor capable of temperature, pressure and contact time constraints for producing high quantities of ethylene from hydrocarbon in the pyrolysis feed. In an aspect, the pyrolysis reactor is a regenerative reactor system such as a regenerative, reverse-flow reactor system. For endothermic reactions operated at elevated temperatures, such as ethane pyrolysis to form ethylene, a reverse flow reactor can provide a suitable reaction environment for providing the heat for the endothermic reaction. More generally, the pyrolysis reaction can be performed in a reactor suitable for handling a reaction cycle with flows introduced from opposing ends of the reactor.

A reactor refers to equipment used for chemical conversion. As such, several items identified as reactors may be combined to become a single entity that is also identified as a reactor, in that individual and combined entities may be characterized as equipment used for chemical conversion. A pyrolysis reactor refers to equipment for converting hydrocarbons by pyrolysis chemistry. Pyrolysis or pyrolysis chemistry involves the conversion of hydrocarbons to unsaturates, particularly $C_2$ unsaturates such as ethylene and acetylene, which is an endothermic reaction requiring addition of heat.

A pyrolysis reactor may include one or more reactors and/or associated equipment and lines. That is, in certain aspects, the pyrolysis reactor includes one or more thermal mass (e.g., one thermal mass or at least two thermal masses in fluid communication with each other and in series, one with the other or may include two thermal masses in series within a single reactor). Examples of such reactors include, but are not limited to, reverse-flow regenerative reactors as those described in U.S. Patent App. Pub. No. 2007/0191664; and pyrolysis reactors as described in U.S. Pat. No. 7,491,250 and U.S. Patent App. Pub. Nos. 2007/0144940 and 2008/0142409.

The terms "crack" and "cracking" may be used interchangeably with the terms pyrolyze and pyrolysis. In a thermal pyrolysis reaction, 50%, 80%, or 90%, of this heat is provided by heat transfer from the reactor, e.g., from solid surfaces, such as tubulars or bed materials. Any combustion chemistry that occurs within the pyrolysis stream of a pyrolysis reactor provides a minority of the endothermic heat of pyrolysis, such as <50%, <20%, or <10% of the endothermic heat of pyrolysis.

A zone, as used herein, refers to a location within the pyrolysis reactor, which may include one or more reactor components and/or associated equipment and lines. The zone may include a specific volume within a reactor, a specific volume between two reactors and/or the combination of different disjointed volumes in one or more reactors. Although the thermal pyrolysis reverse-flow regenerative reactors described herein may comprise a single thermal mass, reactors which include two or more thermal masses or other suitable configurations are within the scope of the invention.

A reaction zone, alternatively referred to as pyrolysis zone, is a location in the thermal pyrolysis system where >50%, >75% and/or >90% of the conversion of hydrocarbons into $C_2$ unsaturates in the pyrolysis system is performed. That is, while some thermal cracking may occur upstream of reaction zone, the reaction zone is the location or volume within the reactor where a substantial amount of the smaller molecules are produced from the initial hydrocarbons provided to the reactor. For example, the reaction zone for a steam cracking system is in the radiant tubes of the steam cracking furnace, while the reaction zone is generally a central location of a reverse-flow regenerative reactor. Thermal mass can be located proximate to the central location. Thermal mass can also be located proximate to any mixing components disposed between one or more zones.

The term "peak pyrolysis temperature" means the maximum temperature achieved by the pyrolysis stream gases (e.g., total gas stream comprising feed and product components) as the gases travel through the pyrolysis reactor (e.g., proximate to one or more thermal mass in the reactor).

The "pyrolysis temperature" can be considered the temperature of the gases in the reaction zone of the pyrolysis reactor, which can be measured by a device (such as a thermocouple) that is not in contact with the thermal mass material. For example, for pyrolysis feed being passed to and traveling through tubulars or through channels in a thermal mass of a pyrolysis reactor, the pyrolysis gas temperature may be taken as the average temperature at a tubular or channel cross-section over which total gas (e.g., feed and converted product gases) passes. The peak pyrolysis gas temperature can be considered the highest cross-sectional-average temperature in the tubular or channel cross-section.

In a reverse flow reactor, the heat needed for an endothermic reaction may be provided by creating a high-temperature heat bubble in the middle of the reactor. A two-step process can then be used wherein heat is (a) added to the reactor bed(s) or monolith(s) via in-situ combustion, and then (b) removed from the bed in-situ via an endothermic process, such as reforming, pyrolysis, or steam cracking. This type of configuration can provide the ability to consistently manage and confine the high temperature bubble in a reactor region(s) that can tolerate such conditions long term. A reverse flow reactor system can allow the primary endothermic and regeneration processes to be performed in a substantially continuous manner.

A variety of regenerative reverse-flow reactors can be utilized. For example, a reverse-flow reactor may include a housing, a plurality of flow-controls (e.g., conduits and valves), one or more insulation components (e.g., insulation bricks) and one or more process flow components (e.g., thermal mass, mixing components, etc.). The housing can be utilized to enclose an interior region and have one or more insulation components disposed adjacent to the housing. The plurality of flow-controls may include one or more conduits, one or more apertures, and one or more valves that are configured to manage the flow of one or more streams into and out of the interior region from a location external to the interior region or housing. Process flow components can be configured and/or arranged to manage the flow of fluids through the interior region. For example, certain process flow components may include a thermal mass having a plurality of portions (e.g., a plurality of segments) with each having different flow passages and a wetted area. One or more mixer or mixer-distributors can be used for mixing feed components.

A basic two-step asymmetric cycle of a regenerative bed reactor system is depicted in FIGS. 1A and 1B of FIG. 1. The two-step cycle depicted in FIGS. 1A and 1B is used to illustrate the nature of performing a cyclical process in a reactor with flows that can enter from opposing directions. More generally, a reaction cycle can include any convenient number of steps, including multiple regeneration steps and/or multiple reaction steps. By using multiple steps, flows for regeneration steps and reaction steps can potentially be introduced from both directions.

The regenerative bed reactor system is shown as a reactor system having separate thermal mass zones, including a second zone (7) [which includes a recuperator/quenching zone toward a first end (9), as well as a portion of a reaction or pyrolysis zone proximate to a second end (11) of the second zone (7)] and a first zone (1) [also including a portion of the reaction or pyrolysis zone proximate to secondary end (5) of the first zone (1)]. Both the first zone (1) and the second zone (7) contain regenerative beds comprising thermal mass. The term regenerative reactor means a regenerative media that may also be used for carrying out a chemical reaction. The thermal mass may comprise material that is effective in storing and transferring heat, such as glass or ceramic beads or spheres, metal beads or spheres, ceramic (including zirconia) or metal honeycomb materials, ceramic tubes, extruded monoliths, and the like, provided they are competent to maintain integrity, functionality, and withstand long term exposure to temperatures in excess of the desired pyrolysis temperatures, e.g., 1200° C. for safe operating margin.

As shown in FIG. 1A, at the beginning of the "pyrolysis step" of the reverse flow cycle, a secondary end (5) of the first zone (1) of the reactor is at an elevated temperature as compared to the primary end (3) of the first zone (1), and at least a portion of the second zone (7) [e.g., the first end (9) of the second zone (7)] is at a lower temperature than the reaction zone [i.e., the portion between of the secondary end (5) of the first zone (1) and the second end (11) of the second zone (7)] to provide a quenching effect for the reaction product. A hydrocarbon-containing pyrolysis feed, optionally comprising a diluent such as methane or steam, is introduced via at least one conduit (15) into the primary end (3) of the first zone (1).

The pyrolysis feed absorbs heat from the first zone (1), and the hydrocarbon of the pyrolysis feed is endothermically reacted to produce the desired $C_2$ unsaturates. As this step proceeds, a shift in the temperature profile (2), as indicated by the arrow, is created based on the heat transfer properties of the system. The thermal mass has heat transfer capability configured to provide a relatively sharp temperature gradient, which gradient will move across the first zone (1) as the endothermic reaction step proceeds. The sharper the temperature gradient profile, the better the reaction may be controlled. As the pyrolysis stream transits the reactor it is first heated and then cooled. At some point of maximum temperature, it will achieve its peak pyrolysis temperature. The reaction or pyrolysis zone is considered to be the location proximate to (e.g., at, near, within, or on) the reactor's thermal mass where the pyrolysis process is carried out at a temperature above 800° C., and the pyrolysis feed is exposed to this zone for a short residence time.

Pyrolysis reaction gas (gas undergoing the pyrolysis reaction) exits the zone (1) through a secondary end (5) at an elevated peak pyrolysis temperature and passes through the zone (7), entering through a second end (11), and exiting at a first end (9) as a pyrolysis product comprising ethylene, acetylene, some unconverted hydrocarbon and diluent, as well as other reaction products. As the pyrolysis reaction gas passes through the zone (7), heat is transferred to the thermal mass in the zone (7), and hot pyrolysis product is quenched or cooled to a temperature below the peak pyrolysis temperature. For example, the temperature of the cooled pyrolysis product can approach the temperature substantially at the first end (9). As the pyrolysis reaction gas is cooled in the zone (7), a temperature gradient (4) representative of peak pyrolysis temperature is created in the zone's regenerative bed(s) and moves across the zone (7) during the pyrolysis reaction. After quenching, the pyrolysis product exits the zone (7) at (9) and is conducted away from the pyrolysis reactor. The pyrolysis product can be processed for separation and recovery of the various components, e.g., ethylene.

The second step of the cycle (FIG. 1B), referred to as the "regeneration step" of the reverse flow cycle, includes a step of introducing combustion feed into the reactor in the reverse flow direction relative to the flow of the pyrolysis feed. In a conventional reverse flow reactor, the fuel and oxidant would be introduced in a manner that allows for control of the location of combustion based on where the fuel and oxidant are allowed to mix. As an example, the hydrocarbon fuel and oxidant components of the combustion feed can be introduced via separated conduits or channels (19) within, for example, a thermal mass material. The thermal mass material can be in the form of a honeycomb comprising at least one first channel and one second channel separated by a barrier, which that prevents at least a majority of a stoichiometrically reactable amount of the hydrocarbon fuel from reacting with the oxidant within the zone (7). Separate streams of hydrocarbon fuel and oxidant can pass separately through hot zone (7) toward the second end (11) of the zone (7), where the separate streams are combined for exothermic reaction or combustion in or near the reaction zone (13) of the reactor system. In doing so, the temperature gradients (6) and (8) may move across the beds as illustrated by the arrows on the exemplary graphs in FIG. 1B, similar to, but in opposite directions of, the graphs of the temperature gradients carried out during the reaction cycle in FIG. 1A. The heat recovered from the zone (7) together with the heat of combustion is transferred to the reaction zone (13), thermally regenerating the thermal mass of the reaction zone.

In contrast to a conventional configuration, in various aspects the location of combustion can be controlled based on the temperature profile within the reactor and the use of combustion catalyst. Prior to contacting the combustion catalyst, the fuel and oxidant can be at a temperature that is below the auto-combustion temperature of the fuel (and/or at temperatures where auto-combustion is possible for a small enough time that auto-combustion does not occur). Combustion is then initiated by contact with the combustion catalyst, with the amount of combustion being controlled by the gradient of catalyst density in the catalyst system.

The thermal mass typically comprises one or more materials which facilitate the process of heat addition and removal. Such materials can be in the form of a network of passages that are used by the gases in each step to transit the region containing solid material; or the materials can correspond to a packed bed of particles that has sufficient void space to allow gas flows with a manageable level of pressure drop; or another convenient type of material configuration can be used. The heat addition step leaves a profile of temperatures in the solid material, that is, a temperature that varies along the path by which the gases transit the solid material. The shape of that profile depends on many factors, including if and where a heat release (combustion) reaction occurs, the initial temperature distribution, the duration of the heating step, the flow rate and inlet temperature of the gas stream, and the heat capacity and transfer properties of the gas and solid material. On average, the solid material is hottest at the end of the heating step. The pyrolysis step consumes heat and reduces the solid material's average temperature. The pyrolysis step changes the profile of temperatures in the solid material, in a way that depends on many factors, including where the heat consumption (pyrolysis) reaction occurs, the initial temperature distribution, the duration of the pyrolysis step, the flow rate and inlet temperature of the gas stream, and the heat capacity and transfer properties of the gas and solid. Fixed-solid regenerative pyrolysis reactors do not operate in the steady state. That is, at any given location, the temperature changes. However, these reactors may be in a periodic steady state, meaning that the same cycling of temperatures occurs over and over as the reactor sequentially repeats the heating and pyrolysis steps.

In certain aspects, the thermal mass is a material (e.g., a solid) that can transfer (e.g., absorb, store, and release) thermal energy over a temperature range for carrying out the reverse flow cycle, which includes the pyrolysis reaction and any optional combustion reaction. For example, the thermal mass can be a solid material that can absorb, release, and store heat to and/or from reactants and products over a temperature range in which pyrolysis can be carried out, including those that do so without any significant phase change. Examples of temperature ranges at which the thermal mass absorbs, stores and releases thermal energy include a range of from 50° C. to 1500° C., alternatively from 100° C. to 1500° C., or from 200° C. to 1500° C., or 250° C. to 1200° C., or 300° C. to 1100° C.

The thermal mass can be characterized by one or more properties. Examples of such properties include, but are not limited to, melting temperature, porosity, bulk density, thermal conductivity, thermal expansion and thermal capacity.

Melting temperatures (melting points) are reflective of the ability of the thermal mass to withstand combustion and pyrolysis temperatures without chemical change and/or physical destruction. Thermal masses having higher melting points are preferred according to this invention. For example, the melting point of the thermal mass of this invention is preferably at least 1200° C., or at least 1500° C.

Geometric void denotes the void volume in major passages of the thermal mass that gases use to transit the reactor, and exclude volumes than may be present in small pores within the walls of the reactor contents. For example, for honeycomb monoliths, geometric void volume includes the volume in the channels, but excludes any pore volume that may exist in the channel walls. For honeycomb monoliths, the term 'open frontal area' is also used in the art to reflect the geometric void. Geometric void is most frequently expressed as a percent of total (solid and void) volume of the object being described. Geometric solid can be considered the filled volume that is not used by gases to transit the reactor. For example, in honeycomb monoliths, the channel walls are considered the geometric solid. For packed beds, the bed packing particles such as spheres, pellets or extrudates (cylinders) are considered the geometric solid, and the gas space between the particles are considered the geometric void.

As an example, the thermal masses utilized in certain embodiments of this invention can have a geometric void between about 10% and 70%, such as between 20% and 60%. Pore volume or porosity within the geometric solid, such as within channel walls of the thermal masses, is preferably minimized to improve thermal properties as discussed below. As an example, the thermal masses utilized in certain embodiments of this invention can have a pore volume within the geometric solid of not greater than 20%, or not greater than 10%, or not greater than 5%.

Bulk density is a measure of the weight of a given volume of the thermal mass. Higher bulk densities, with lower geometric void fraction, can be particularly effective. As an example, the thermal mass utilized in certain embodiments of this invention can have a bulk density of at least 0.5 g/cm$^3$. For example, the bulk density can be from 0.5 g/cm$^3$ to 5 g/cm$^3$ or from 1 g/cm$^3$ to 3 g/cm$^3$.

Thermal conductivity is defined as the quantity of heat that will flow through a unit area in direction normal to the surface area in a defined time with a known temperature gradient under steady state conditions. Thermal conductivity represents a general heat flow characteristic of the geometric solid of the thermal mass. Higher thermal conductivity thermal masses are preferred. For example, the geometric solid of the thermal mass can have a thermal conductivity of from 0.1 W/mK to 50 W/mK or from 0.5 W/mK to 30 W/mK.

Thermal expansion of the thermal mass should not be so great such that cracking of the material occurs during operation of the reaction system. In one aspect, the thermal mass can be characterized by a thermal expansion coefficient. For example, the thermal mass can have a thermal expansion coefficient of from $0.1 \times 10^{-6}$/K to $20 \times 10^{-6}$/K or from $0.2 \times 10^{-6}$/K to $15 \times 10^{-6}$/K. In this example, the thermal expansion coefficient is given as a value in a temperature range of from 25° C. to 800° C.

Thermal capacity is the ability of a material to hold heat. The thermal masses utilized in certain embodiments of this invention preferably has a higher thermal capacity, but not so high as to increase the probability of cracking at higher temperatures. For example, the thermal masses utilized in certain embodiments of this invention can have a thermal capacity of from 250 J/dm$^3$K to 4500 J/dm$^3$K or from 500 J/dm$^3$K to 3000 J/dm$^3$K.

Checker bricks, tiles, and monoliths can be used as to form the reactor's thermal mass, or portions, regions, and segments thereof. Such materials can be in the form of or can be arranged to form a network of passages that are used by the gases in each step to transit one or more regions of the reactor. The thermal mass can be a ceramic, which may include yttria, zirconia, alumina, and/or other refractory material capable of adsorbing, storing and transferring heat, and that are effective in withstanding temperatures within the pyrolysis reactor.

Wetted area is the surface over which heat is transferred from geometric solid to the gas in the geometric void, and has units of geometric surface area per bulk volume of thermal mass (pore volume within the geometric solid is excluded). Typically, thermal mass having a high surface area per unit volume is used to aid achieving a relatively quick change in the temperature through the reactor. The thermal mass can provide an average wetted surface area per unit volume that ranges from about 1 cm$^{-1}$ to about 100 cm$^{-1}$, e.g., from about 3 cm$^{-1}$ to 80 cm$^{-1}$, and such as from about 5 cm$^{-1}$ to 50 cm$^{-1}$.

The thermal mass can include separate passages to manage the flow of hydrocarbon components and or oxidant through the reactor and reactor components, regions, and zones. Multiple thermal masses can be arranged to accommodate heat flow to heat the feed mixture and quench the reaction products. Typically, each thermal mass includes separate passages. The separate flow passages in the thermal mass can further comprise flow barriers that effectively function as walls to lessen or prevent cross flow or mixing of fluids (e.g., reactants, oxidants, and/or products) between passages, except in the desired regions of the reactor. Each thermal mass preferably includes multiple passages, which may preferably be in parallel flow arrangement. The channeled thermal mass may preferably be comprised of one or more honeycomb monoliths. Preferred honeycomb monoliths are structures that comprise many (e.g., a plurality, meaning more than one) gas flow passages, arranged in parallel fashion with walls serving to separate each passage. Such reactor can include a single monolith or a plurality of monoliths. Each monolith can be formed by extruding or die pressing monolith blocks with shaped (e.g., square or hexagonal) cross-section and two- or three-dimensionally stacking, such blocks above, behind, and beside each other. Monoliths are particularly effective as thermal mass because they provide high heat transfer capacity with lessened pressure drop.

In aspects where a monolith is used, the monolith can have any convenient shape suitable for use as a catalytic surface. An example of a monolith can be an extruded honeycomb monolith. Honeycomb monoliths can be extruded structures that comprise many (e.g., a plurality, meaning more than one) small gas flow passages or conduits, arranged in parallel fashion with thin walls in between. A small reactor may include a single monolith, while a larger reactor can include a number of monoliths, while a still larger reactor may be substantially filled with an arrangement of many honeycomb monoliths. Each monolith may be formed by extruding monolith blocks with shaped (e.g., square or hexagonal) cross-section and two- or three-dimensionally stacking such blocks above, behind, and beside each other. Monoliths can be attractive as reactor internal structures because they provide high heat transfer capacity with minimum pressure drop.

In some aspects, honeycomb monoliths can be characterized as having open frontal area (or geometric void volume) between 25% and 55%, and having conduit density between 50 and 2000 pores or cells per square inch (CPSI), or between 100 and 900 cells per square inch, or between 100 cells per square inch to 600 cells per square inch. For example, in one embodiment, the conduits may have a diameter/characteristic cell side length of only a few millimeters, such as on the order of roughly one millimeter. Reactor media components, such as the monoliths or alternative bed media, can provide for channels that include a packing with an average wetted surface area per unit volume that ranges from 50 ft$^{-1}$ to 3000 ft$^{-1}$ (~0.16 km$^{-1}$ to ~10 km$^{-1}$), or from 100 ft$^{-1}$ to 2500 ft$^{-1}$ (~0.32 km$^{-1}$ to ~8.2 km$^{-1}$), or from 200 ft$^{-1}$ to 2000 ft$^{-1}$ (~0.65 km$^{-1}$ to ~6.5 km$^{-1}$), based upon the volume of the first reactor that is used to convey a reactant. These relatively high surface area per unit volume values can aid in achieving a relatively quick change in the temperature through the reactor.

Pyrolysis Reaction Conditions

In the pyrolysis step of a reverse-flow reactor, pyrolysis feed comprised of hydrocarbon, and optionally diluent, can be supplied to or injected into an end of the reactor via pyrolysis injection components. The pyrolysis feed may be supplied to or injected into the pyrolysis reactor following the removal of the combustion products from the heating step, which may include a sweeping or purging step to remove products from the internal regions of the entire reactor. That is, the pyrolysis stream can be configured to flow through the first and/or second end of the thermal mass of a reverse-flow reactor. In a reverse-flow reactor, the pyrolysis or hydrocarbon stream is typically provided at a different end of the reactor from the end that the combustion streams were supplied or injected. In other words, direction of flow of the pyrolysis stream may be counter to (e.g., reverse of) the direction of flow of the combustion streams, or in certain aspects may be in the same direction, which may also involve some alternating patterns of flow. It is noted that a reaction cycle may include multiple steps, so that the flow direction of a pyrolysis step may be counter to the flow direction of a preceding combustion/regeneration step, but co-current with the flow direction of a subsequent combustion/regeneration step. This can allow a reaction cycle with multiple combustion steps and multiple pyrolysis steps to be performed with combustion flows and pyrolysis flows that enter from both ends of the reactor.

As the pyrolysis feed stream flows through the pyrolysis preheat zone, the temperature of the pyrolysis feed increases. As the temperature increases to the appropriate level, pyrolysis of the hydrocarbon in the pyrolysis feed stream takes place, typically in the reaction zone, as a result of heat transfer from the reactor's thermal mass. Following the reaction zone, the pyrolysis products (e.g., unreacted and reacted hydrocarbons) are flowed through a pyrolysis quenching zone, which reduces the temperature of the pyrolysis products such as below the peak pyrolysis temperature. Typically, pyrolysis products flowed through the same channels in the thermal mass as are used for conveying fuel and oxidant in the reverse-flow direction during a combustion step. The pyrolysis products can be removed from the pyrolysis quenching zone, and further passed for processing in recovery units to process and separate one or more of ethylene, acetylene and hydrogen.

In the pyrolysis step, the pyrolysis reaction is carried out relatively quickly to avoid over-cracking so as to avoid excessive formation of undesirable by-products, particularly coke and tar compositions. Accordingly, pyrolysis reactors may be characterized in terms of the residence time of total pyrolysis gases (e.g., feed and product gases) within the thermal mass of the pyrolysis reactor.

The pyrolysis reactor typically includes a quenching zone in a portion of the thermal mass, especially in a portion of the reactor in which the endothermic reactions are slowed. That is, average temperature within the quenching zone is less than the peak pyrolysis temperature range of the reaction zone, such as at least 50° C., or at least 100° C., or at least 200° C. less than the peak pyrolysis temperature in the reaction zone.

In the quenching zone, the peak pyrolysis reaction temperature may be lowered (i.e., the reaction quenched) at desired ethylene conversion ratios by cooling the reaction gas or products to reduce further reactions that may form carbon and other less desired hydrocarbon compounds. The quenching is generally a rapid cooling that involves passing the pyrolysis products through or across the thermal mass. In certain embodiments, the quenching zone may be actively performed by injecting water, other hydrocarbons, oil, solvent or other suitable fluids into the reactor to substantially cool below the peak pyrolysis temperature.

As may be appreciated, the flow of pyrolysis feed can be interrupted after a desired or predetermined time and the combustion feed can be provided to again heat the reactor, such as in the reverse flow direction of the pyrolysis feed in a reverse-flow reactor. By repeating the heating step and the pyrolysis step, the overall reaction process can be continuously carried out over a relatively long period of time.

As an example of a reverse flow reaction, during a first time interval, a pyrolysis feed can be passed to a reactor such as a reverse-flow reactor comprising a thermal mass, with the thermal mass having a first zone, a second zone, and with the reaction zone being intermediate to the first and second zones. Heat from the first zone (which contains previously-heated thermal mass) can be transferred from the thermal mass to the pyrolysis feed, preferably exposing the pyrolysis feed to the desired peak pyrolysis temperature and hydrocarbon partial pressure conditions in the reaction zone, which produces pyrolysis product comprising desired levels of $C_2$ unsaturates. Heat from the pyrolysis product can be transferred to the second zone (which contains a previously cooled thermal mass) to cool the pyrolysis product to a temperature below the peak pyrolysis temperature, with the passing of the pyrolysis feed to the reverse-flow reactor being discontinued at the desired cooling level.

Optionally, during a second time interval, combustion feed can be provided to the reverse-flow reactor, with heat being transferred from the second zone to the combustion feed. The hydrocarbon fuel and oxidant components of the combustion feed can exothermically react to produce combustion products and heat. Heat from the combustion reaction can be transferred to thermal mass located proximate to the first zone of the reactor to cool the combustion products, with the passing of the combustion feed to the reverse-flow reactor being lessened or discontinued at the desired heating level.

In various aspects, the pyrolysis reactor can be operated so that surfaces in the reaction zone achieves a temperature suitable for performing pyrolysis while reducing or minimizing the peak temperature within the reactor. One or more surfaces in the reaction zone can be heated to a temperature of 750° C. to 1000° C., or 800° C. to 1000° C., or 850° C. to 1000° C., or 900° C. to 1000° C., or 750° C. to 950° C., or 800° C. to 950° C., or 750° C. to 900° C., or 750° C. to 875° C. Additionally, the peak temperature in the reaction zone can be 1000° C. or less, or 975° C. or less, or 950° C. or less, or 900° C. or less, or 875° C. or less.

The pyrolysis reactor can further be operated at a pressure range effective for producing high quantities of ethylene from hydrocarbon in the feed relative to typical pyrolysis reactions. In particular, during a pyrolysis step, the pyrolysis reactor can operated to expose a pyrolysis feedstock to an effective ethylene-producing temperature within the pyrolysis zone at a pressure range further effective for producing high quantities of ethylene. For example, the hydrocarbon content of the feed in the pyrolysis zone of the reactor can have a partial pressure of 7 psia (48 kPa-a) or more, or 10 psia (69 kPa-a) or more, or 20 psia (138 kPa-a) or more, or 30 psia (207 kPa-a) or more, such as up to 500 kPa-a or possibly still higher. Additionally or alternately, the total pressure in the pyrolysis zone during pyrolysis can be 5 psig (34 kPag) or more, or 15 psig (103 kPag) or more, or 40 psig (276 kPag) or more, or 80 psig (552 kPag) or more, or 120 psig (827 kPag) or more. For practical considerations on total pressure, the pyrolysis reaction can be carried out at a pressure condition in which the pyrolysis zone of the reactor is at a total pressure of 500 psig (3447 kPag) or less, or 300 psig (2068 kPag) or less, or 150 psig (1034 kPag) or less.

Total gas residence time for the pyrolysis gas stream (i.e., total gas comprising the feed and product components) within the pyrolysis reactor is relatively short. For example, pyrolysis feed can be passed through the reactor at a total gas residence time in the thermal mass of 1.0 second or less, or 0.8 seconds or less; preferably 0.75 seconds or less, or 0.6 seconds or less; or in the range of 0.01 seconds to 1.0 second, or in the range of 0.01 seconds to 0.8 seconds, or in the range of 0.1 seconds to 1.0 seconds, or 0.1 seconds to 0.75 seconds. Additionally or alternately, the residence time for the gas flow within the high temperature portion of the reactor (i.e., the portion of the reactor where the temperature is greater than 750° C., or greater than 800° C., or greater than 850° C.) can also be characterized. In some aspects, the residence time for the pyrolysis gas flow within the high temperature portion of the reactor can be 0.01 seconds to 0.4 seconds, or 0.01 seconds to 0.3 seconds, or 0.01 seconds to 0.2 seconds, or 0.05 seconds to 0.4 seconds, or 0.05 seconds to 0.3 seconds, or 0.05 seconds to 0.2 seconds. When determining residence time, it is noted that after characterizing the temperature profile in the reactor, the velocity of the gas flow can be used to determine the residence time within the high temperature region of the reactor.

For a regenerative reactor, the process may operate at cycle times in the range of 1 second to 240 seconds, in the range of 1 second to 60 seconds, in the range of 2 seconds to 40 seconds, in the range of 2 seconds to 20 seconds, or in the range of 3 seconds to 10 seconds.

A substantial amount of ethylene can be produced at the appropriate temperature, pressure and contact conditions as noted herein. For example, the pyrolysis feedstock can be exposed at the appropriate temperature, pressure and contact conditions to convert $\geq 10$ wt %, or $\geq 20$ wt %, or $\geq 30$ wt %, or $\geq 40$ wt %, or $\geq 50$ wt % of total hydrocarbon in the feedstock to $C_2$ unsaturates. The $C_2$ unsaturates will have a relatively high concentration of ethylene compared to typical processes. For example, the $C_2$ unsaturates can have an ethylene:acetylene molar ratio of $\geq 1:1$, $\geq 5:1$, or $\geq 10:1$, or $\geq 15:1$. Based on the type of feed, the amount and types of hydrocarbons in the product slate can also vary. For example, if the feed for pyrolysis is an ethane feed (e.g., 80 vol % or more ethane, or 90 vol % or more, such as up to 100 vol %, an example of a per pass yield can correspond to 50-53 wt % ethylene, 0.5-1.0 wt % acetylene, 5-8 wt % methane, 4-4.5 wt % $H_2$, and 5-10 wt % $C_{3+}$. A balance of 25-35 wt % ethane can be separated and recycled back to the reactor. For a naphtha feed, typical per-pass yield can be 25-30 wt % ethylene, 15-20 wt % propylene, 14-17 wt % methane, 0.9-1.1 wt % hydrogen, 3-5 wt % ethane, 0.5-1.0 wt % propane, 0.3-0.5 wt % acetylene, and 30-35 wt % $C_{4+}$.

Pyrolysis Feed

A pyrolysis feed is injected into a first end of a pyrolysis reactor and flowed through a reaction zone within the pyrolysis reactor in which the reaction zone is at a process condition that pyrolyzes hydrocarbon in the feed to produce a pyrolyzed hydrocarbon product. Pyrolysis (alternatively pyrolysis process or pyrolyzation) is generally defined as a thermal decomposition process in which the pyrolysis feed is heated, generally in the absence of oxidative combustion, to decompose hydrocarbon (i.e., break or crack the C—C and/or C—H bonds of the hydrocarbon) to produce unsaturated hydrocarbon molecules.

In general, pyrolysis feed refers to a hydrocarbon-containing feed that is fed to (i.e., enters) the pyrolysis reactor for conversion into pyrolysis products including $C_2$ unsaturates. The hydrocarbon in the pyrolysis feed can be derived from any hydrocarbon feed capable of being thermally cracked into unsaturated hydrocarbon compounds. The hydrocarbon may be optionally treated for use as pyrolysis feed, or a component thereof. For example, hydrocarbon can include substantial amounts of non-volatiles such that the hydrocarbon itself would not be desirable as a pyrolysis feed component, unless at least a portion of the non-volatiles was removed. In such cases, the hydrocarbon can be treated to lessen the amount of non-volatiles, or any other type of hydrocarbon or non-hydrocarbon component as desired. Examples of such treatment include, but are not limited to, treatment by resid hydrotreaters, hydrovisbreakers, acid washes, filtration, chelation, membrane or filtration, distillation, solvent extraction, adsorption, resid hydrotreater, acid extraction, or any number of metals reduction processes.

Hydrocarbons useful as pyrolysis feed or components of a pyrolysis feed include chemical compounds having at least one C bound to at least one H. The hydrocarbon compounds may contain (i) minor components of covalently bound heteroatoms (less than (<) 10 weight percent (wt %)) and (ii) minor components of non-covalently bound heteroatoms (<10 wt %) (e.g., $H_2O$), wherein these weight percentages are based on total weight of the hydrocarbon feed. Reference to "hydrocarbon compounds" or "hydrocarbons in the pyrolysis feed" means molecules that contain at least hydrogen and carbon and, optionally containing one or more heteroatoms such as oxygen, sulfur and nitrogen. Weight percentages of hydrogen and carbon, as used to characterize the hydrocarbon content of the pyrolysis feed, are typically provided as a percentage of the total hydrocarbon compounds in the pyrolysis feed. Preferably, the hydrocarbon compounds are comprised of at least 75 percent (%) of both carbon and hydrogen, based on total atom content of the hydrocarbon compounds in the total pyrolysis feed to the reactor.

The hydrocarbon portion of the pyrolysis feed may include, by way of non-limiting examples, one or more of ethane and $C_{3+}$ hydrocarbons, in which $C_{3+}$ hydrocarbons refers to compounds containing three or more carbon atoms. For example, the hydrocarbon of the pyrolysis feed can comprise one or more of propane, propylene, butane, butylene and higher hydrocarbons. Additional examples of $C_{3+}$ hydrocarbons include, but are not limited to Fischer-Tropsch products, shale gas, biogas, associated gas, natural gas and mixtures or components thereof, steam cracked gas oil and residues, gas oils, heating oil, jet fuel, diesel, kerosene, gasoline, naphtha (including coker naphtha, steam cracked naphtha, and catalytically cracked naphtha), hydrocrackate, reformate, raffinate reformate, Fischer-Tropsch liquids, natural gasoline, distillate, virgin naphtha, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, synthetic crudes, shale oils, coal liquefaction products, coal tars, tars, atmospheric resid, heavy residuum, $C_4$'s/residue admixture, naphtha residue admixture, cracked feed, coker distillate streams, hydrocarbon streams derived from plant or animal matter and any mixtures thereof.

Particular hydrocarbons useful in pyrolysis feed according to this invention are those that can be pyrolyzed to produce a product containing alkene compounds, particularly ethylene, at the desired pyrolysis conditions of temperature, pressure and total gas residence times. Typically, the hydrocarbon compounds are those that can be pyrolyzed to produce product containing equal to or greater than ($\leq$) 1 volume percent (vol. %), more preferably $\leq 3$ vol. %, and most preferably $\leq 6$ vol. % alkene compounds (particularly ethylene), based on total volume of pyrolyzed product produced form the pyrolysis process.

In an embodiment, the pyrolysis feed or feed mixture can comprise hydrocarbon rich in ethane in which $\leq 10$ wt %, or ≤20 wt %, or ≤30 wt %, or ≤40 wt %, or ≤50 wt % of total hydrocarbon in the feedstock is converted to $C_2$ unsaturates. For example, hydrocarbon rich in ethane can be hydrocarbon comprised of ≤50 wt %, or ≤60 wt %, or ≤70 wt %, or ≤80 wt %, or ≤90 wt % ethane. The ethane can be provided from any source. For example, the ethane can be provided from synthetic or natural sources. In one embodiment, the ethane is provided from a petroleum refining process. In an alternative embodiment, the ethane is provided from a geological source or geological origin, such as natural gas.

The pyrolysis feed optionally includes one or more diluents. Typical diluents are compounds that are essentially non-reactive under pyrolysis conditions as specified herein, e.g., compounds that are essentially resistant to cracking at the pyrolysis conditions in the pyrolysis zone of the reactor. Diluent can be used to moderate the pyrolysis reaction, e.g., to control total pressure in the reactor. Examples of useful diluents include, but are not limited to, one or more of methane, water (e.g., steam), hydrogen, nitrogen and the noble gases, such as helium, neon and argon.

In an embodiment, the pyrolysis feed or feed mixture can comprise diluent in which ≤10 wt %, or ≤20 wt %, or ≤30 wt %, or ≤40 wt %, or ≤50 wt % of total pyrolysis feed or first mixture is diluent. The amount of diluent typically depends on desired total pressure of the pyrolysis reaction carried out in the reaction zone and desired partial pressure of the hydrocarbon. Diluent is particularly useful to increase total pressure and to reduce coke formation. For example, diluent can be particularly useful at a total pyrolysis pressure of ≤15 psig (103 kPag), or ≤40 psig (276 kPag), or ≤80 psig (552 kPag), or ≤120 psig (827 kPag).

In certain aspects, the diluent comprises at least one of methane and water. In an embodiment the pyrolysis feed can be comprised of a natural gas such as a shale gas that comprises a majority of methane and a minority of ethane and $C_{3+}$ hydrocarbons. In such an embodiment, the diluent can be comprised of at least one of methane and water in an amount of ≤50 wt %, or ≤60 wt %, or ≤70 wt %, or ≤80 wt %, or ≤90 wt % of the total diluent in the pyrolysis feed or first mixture. Such diluents are particularly useful at the total pressures previously indicated.

The pyrolysis feed can comprise a volatile hydrocarbon component and a non-volatile hydrocarbon component. A volatile hydrocarbon may be referred to as a hydrocarbon that can be vaporized at one atmosphere, with little if any residue remaining after achieving final boiling point. Volatile hydrocarbons useful according to the present invention can include lower boiling point hydrocarbons. For example, the volatile hydrocarbon component may be a hydrocarbon composition having a final boiling point of not greater than 1050° F. (566° C.), which can also be referred to as a 1050° F. (566° C.) fraction. Boiling points as referred to herein are preferably determined according to ASTM D86-07 Standard Test.

Reactor Temperature Modeling Examples

Example 1-4 Step Reaction Cycle

A 1-dimensional reactor model was developed based on the "Basic One-Dimensional Model" of a Fixed Bed Catalytic Reactor from Froment and Bischoff, *Chemical Reactor Analysis and Design,* 2nd Ed. John Wiley & Sons, pg. 403. Based on this 1-dimensional reactor model, the steady state temperature profile within the reactor was calculated for performing pyrolysis under various conditions. When determining the steady state profile, fluid flow was calculated according to published equations and standard values for fluid viscosities.

The pyrolysis and combustion reactions were also modeled. The pyrolysis was modeled based on using a pyrolysis feed corresponding to 100% ethane. For combustion, the fuel was modeled as a mixture of methane, $O_2$, and inert diluent. However, rather than modeling the combustion reaction, the rate constant for combustion was selected based on position of the fuel stream within the reactor. This allowed different combustion rates to be used, so that the model could be used to investigate variations in the temperature profile as the combustion time was varied.

The first set of simulations was modeled for a reactor with dimensions of 11.3 feet (3.4 m) diameter by 10.8 feet (3.3 m) height. The reactor included a packing of dense alumina monolith with 35% void volume (open frontal area), 130 round channels per square inch, and a packed density of 2.1 $T/m^3$ (metric tons per $m^3$). The reactor has a headspace of 8 inches above and below the packing. Valves are mounted on the floor and ceiling of the reactor. The total internal reactor volume, including the headspace and voids in the packing, is 30.8 $m^3$. During these simulations, the combustion rate constant within the reactor was set to 0 from the top of the reactor to a depth of roughly 1.2 m. After that a non-zero rate constant was selected. The combustion was modeled as gas phase combustion. The non-zero rate constant was selected in various runs to achieve different combustion times. In the simulations, the combustion time refers to the amount of time from the initiation of combustion to when complete combustion is achieved.

In a first set of simulations, steady state temperature profiles were calculated for performing pyrolysis in the reactor model using a reaction cycle with a total of four steps, including a single combustion step and a single pyrolysis step. The steps during the reaction cycle include 1) a fuel gas and air mixture is introduced from a first direction for combustion to heat the reactor; 2) a purge flow of steam is then introduced from the first direction to purge the reactor; 3) the pyrolysis feed (ethane) is then introduced from the opposite (second) direction; and 4) a second purge flow of steam is then introduced from the second direction. This cycle is then repeated.

All feeds to the reactor are preheated to a temperature of 170° C. The flow of air and fuel gas in step 1 is 58 kg/s at a feed pressure of 15 psig after the feed valve. The flow of ethane in Step 3 is 60 kg/s at a feed pressure of 25 psig after the feed valve. The flow of steam is adjusted to 64 kg per four-step cycle which is about enough to fill five reactor volumes on each of Steps 2 and 4 in the cycle. It is noted that under this strategy, the amount of purge steam is not increased as the cycle length increases. Instead, as the length of the purge steps increases, the same amount of steam is delivered over a longer period of time.

Feed and product valves ensure that the flows are segregated into the four sequential steps as noted. During the simulations to determine steady state temperature profiles, the cycle is adjusted so the reactor spends 67% of the time in Step 1, 5.5% of the time in Step 2, 22% of the time in Step 3, and 5.5% of the time in Step 4. The total cycle time was adjusted so that the conversion rate of ethane to ethylene varies from 71% to 62% between the start and the end of the pyrolysis cycle. Starting the pyrolysis at 71% and ending at 62% can allow for a comparison between cycles. In particular, since the flow rates during each step are fixed and the relative time length of each step is fixed, a longer total cycle time indicates a cycle where the pyrolysis conditions are stable for a longer period of time. In addition to cycle length, the temperature profile can also be compared.

FIG. 2 shows the steady state temperature profile when the combustion rate constant was set to a value that resulted in a combustion time of 6 milliseconds. A combustion time of 6 milliseconds is believed to represent a typical combustion time (once combustion is initiated) for combustion of fuel under either auto-combustion conditions or when a conventional catalyst loading is used. Line 202 shows the temperature of the air and fuel mixture at the end of the combustion or heating step. Line 204 shows the corresponding temperature of the heat transfer solids at the end of the combustion or heating step. Line 206 shows the temperature of the ethane flow at the end of the pyrolysis step. It is noted that for the reaction shown in FIG. 2, the temperature of the solid is similar to the temperature of the ethane at the end of the pyrolysis step. As shown in FIG. 2, modeling a conventional combustion condition resulted in a temperature profile with a sharp peak at or near the location where combustion is initiated. Due to the short combustion time, only minimal amounts of fluid flow can occur during the time scale for combustion, so that a large portion of the combustion heat is generated in a limited volume. This results in a substantial temperature peak, while also reducing the volume within the reactor that has a desirable temperature for performing pyrolysis.

Figure 3:
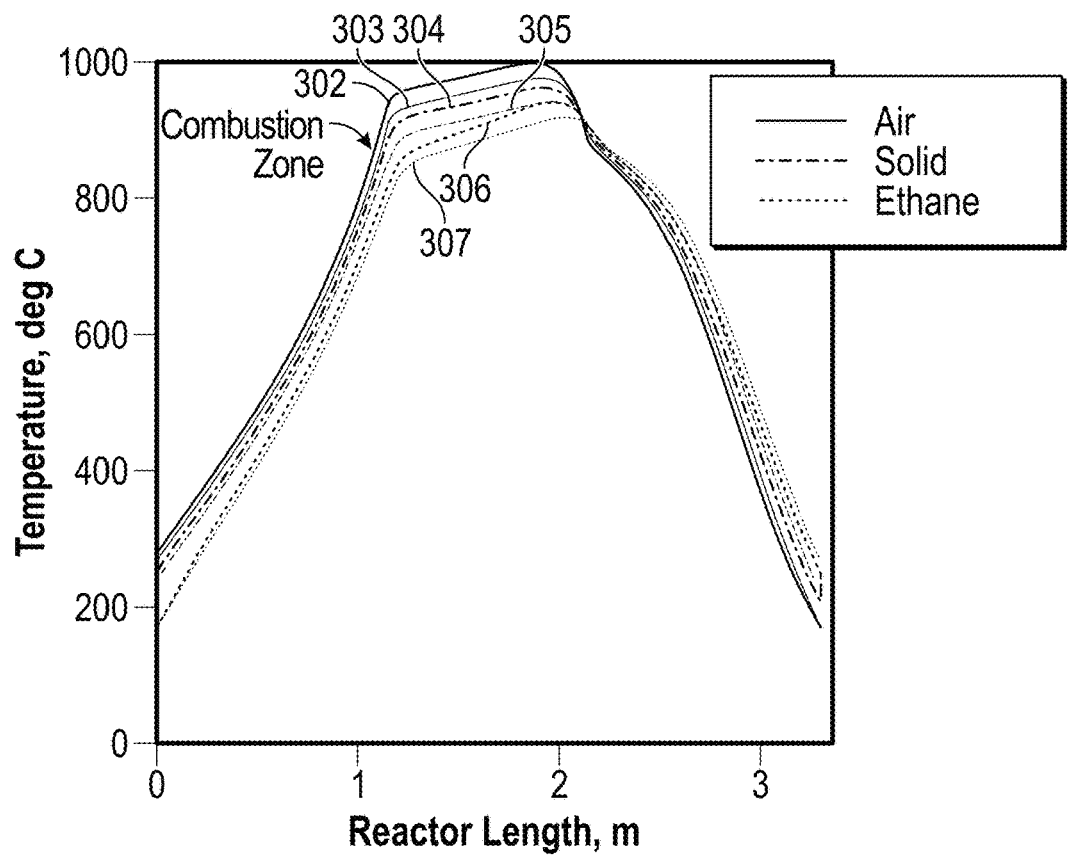
FIG. 3 shows various temperatures within a reactor based on modeling of a cyclic pyrolysis process with a combustion time of 26 milliseconds during the combustion step.

FIG. 3 shows results from another modeling run, but with the combustion rate constant set to a value where the combustion time is 26 milliseconds. This is longer than a conventional combustion time. This longer combustion time can be achieved, for example, by avoiding auto-combustion of fuel within the reactor, in combination with using a catalyst system with a gradient of catalyst density so that a relatively small amount of catalyst is available at the location where combustion is initiated. Although the catalyst density gradient is not explicitly modeled in the simulation corresponding to FIG. 3, it is believed that FIG. 3 is representative of the results that can be achieved by extending the combustion time by using a catalyst system with a catalyst density gradient. In FIG. 3, lines 302 and 303 show the air temperature at the beginning (302) and the end (303) of the combustion or heating step. Lines 304 and 305 show the corresponding temperature of the heat transfer solids at the beginning (304) and end (305) of the combustion or heating step. Lines 306 and 307 show the temperature of the ethane flow at the beginning (306) and end (307) of the pyrolysis step. It is noted that for the reaction shown in FIG. 3, the temperature of the solid is similar to the temperature of the ethane during the pyrolysis step. As shown in FIG. 3, the peak temperature in the reactor is substantially reduced relative to FIG. 2. The peak solid temperature in FIG. 2 was near 1200° C., while the peak solid temperature in FIG. 3 was below 1000° C. This substantial reduction in peak temperature would correlate to reduced coke production within the reactor, as well as reducing the amount of material stress and/or fatigue experienced by the reactor.

Figure 4:
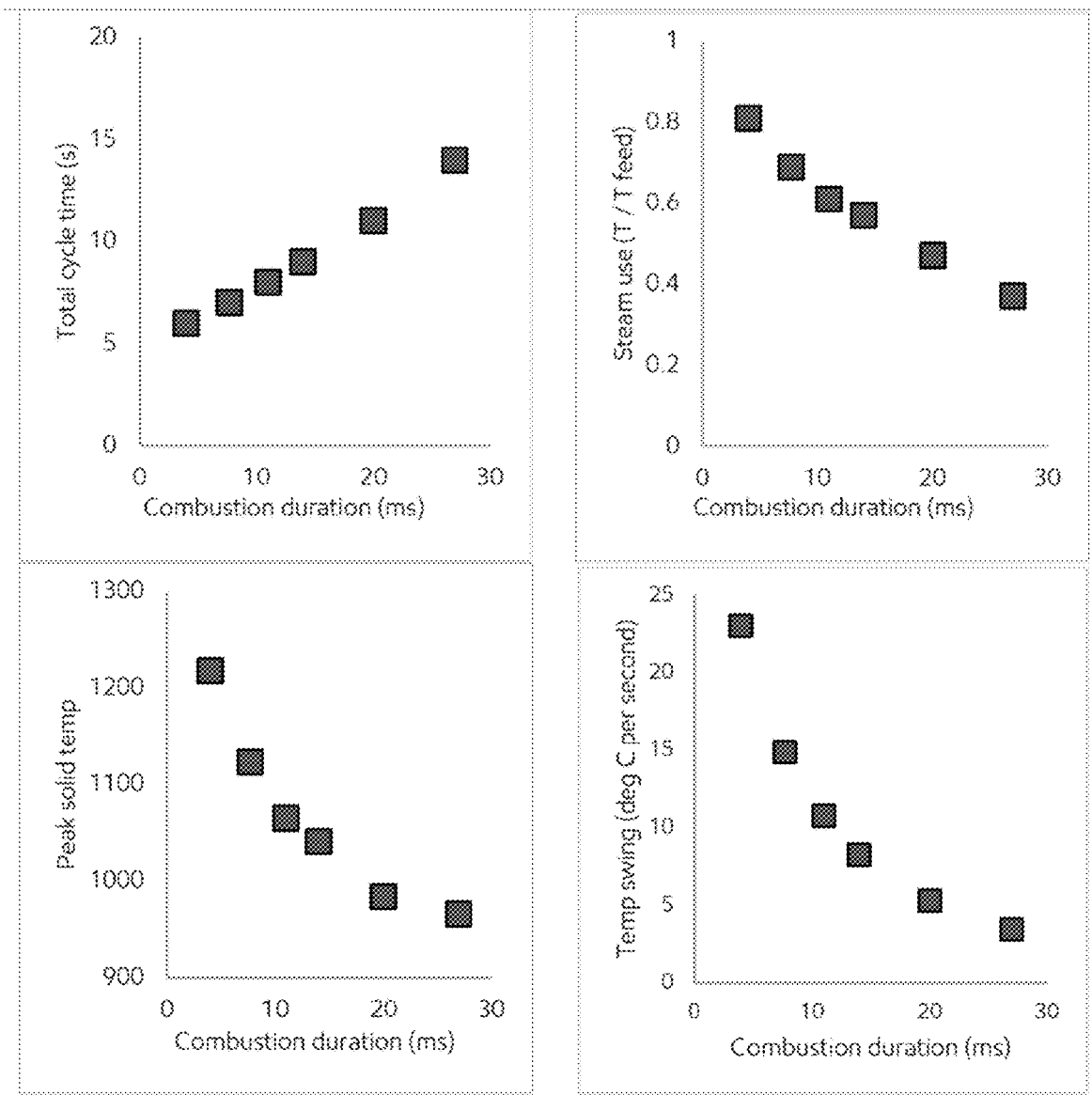
FIG. 4 shows results based on modeling of cyclic pyrolysis processes with various combustion times.

FIG. 4 provides additional comparison of values from the simulations. In addition to the simulations shown in FIG. 2 (combustion time 6 milliseconds) and FIG. 3 (combustion time 26 milliseconds), simulations were also performed with combustion times ranging from roughly 4 milliseconds to 26 milliseconds. In FIG. 4, the first plot shows total cycle time relative to the combustion time. As shown in FIG. 4, extending the combustion time also extends the total cycle time. The second plot in FIG. 4 that the amount of purge steam used is reduced as combustion time is extended. This is due to the fact that the amount of purging needed between steps in a cycle is based on reactor volume, and not based on the length of the pyrolysis step. Thus, by extending the cycle time (via extending the combustion time), the percentage of time that the reactor is performing pyrolysis relative to purge steps can be increased. The third plot in FIG. 4 shows the peak solid temperature versus combustion time, as noted above. The fourth plot in FIG. 4 shows another measure of stress in the reactor, corresponding to the temperature swing per second that is experienced at the location of the peak temperature in the reactor. Due to the lower peak temperature and the longer cycle with longer combustion times, the amount of stress placed on the reactor can be reduced.

Example 2-7 Step Reaction Cycle

A second set of modeling runs were performed to model a different reactor configuration and a different reaction cycle. The overall equations used were similar to the equations used in Example 1, but with some changes to how coefficients were calculated to reflect different packing that was used in the reactor.

The second set of simulations was modeled for a reactor with dimensions of 14 feet (4.3 m) diameter by 7.2 feet (2.2 m) height. The reactor includes a packing of dense alumina spheres with 36% void volume, ⅜ inch (9.6 mm) diameter, and a packed density of 2.1 T/m$^3$. The reactor has a headspace of 1.5 inches above and below the packing with recesses for the valve mounts of 8 inches. Valves are mounted on the floor and ceiling of the reactor. The total internal reactor volume, including the headspace and voids in the packing, is 25.8 m$^3$. During these simulations, the combustion rate constant within the reactor was set to 0 from the top of the reactor to a depth of roughly 0.7 m. Similarly, the combustion rate constant was set to 0 from the bottom of the reactor to a depth of roughly 0.7 m. In the remaining portions of the reactor a non-zero rate constant was selected. The non-zero rate constant was selected in various runs to achieve different combustion times. The combustion was modeled as combustion occurring at the solid surface (packing) in the reactor.

In a first set of simulations, steady state temperature profiles were calculated for performing pyrolysis in the reactor model using a reaction cycle with a total of seven steps, including two combustion steps and two pyrolysis steps. The steps during the reaction cycle include 1) a fuel gas and air mixture is introduced from a first direction for combustion to heat the reactor; 2) a fuel gas and air mixture is introduced from a second (opposite) direction for heating the reactor; 3) a purge flow of steam is introduced from the second direction to purge the reactor; 4) a pyrolysis feed (ethane) is introduced from the first direction; 5) a purge flow of steam is introduced from the first direction; 6) a pyrolysis feed (ethane) is introduced from the second direction; and 7) a purge flow of steam is introduced from the second direction. This cycle is then repeated.

Feed and product valves ensure that each flow is segregated in seven sequential steps as noted. The cycle is adjusted so the reactor spends 23% of the time in Step 1; 23% of the time in Step 2; 4.5% of the time in Step 3; 27% of the time in Step 4; 18% of the time in Step 5; and 4.5% of the time in Step 6. The total cycle time was adjusted so that the conversion rate of ethane to ethylene varies from 71% to 62% between the start and the end of each pyrolysis cycle. All feeds are maintained at a temperature of 170° C. The flow of air and fuel gas in Steps 1 and 2 is 28.3 kg/s at a feed pressure of 15 psig after the feed valve. The flow of ethane in Step 4 is 60.3 kg/s at a feed pressure of 25 psig after the feed valve. The flow of ethane in Step 4 is 39.8 kg/s at a feed pressure of 24 psig after the feed valve. The flow of steam is adjusted to 38 kg per seven-step cycle which is enough to fill about two reactor volumes on each of Steps 3 and 7 and about one reactor volume in Step 5. It is noted that under this strategy, the amount of purge steam is not increased as the cycle length increases. Instead, as the length of the purge steps increases, the same amount of steam is delivered over a longer period of time.

Figure 5:
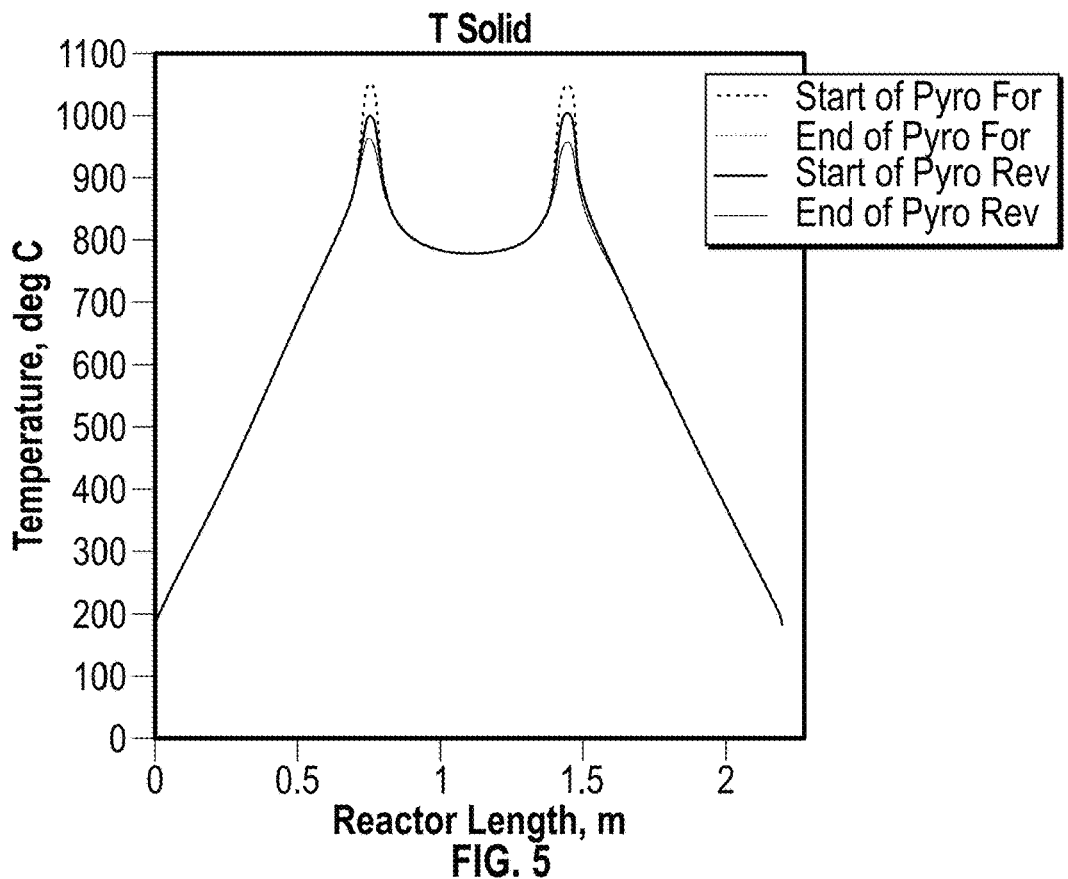
FIG. 5 shows solid surface temperatures within a reactor based on modeling of a cyclic pyrolysis process with a combustion time of 5 milliseconds during combustion steps.
Figure 6:
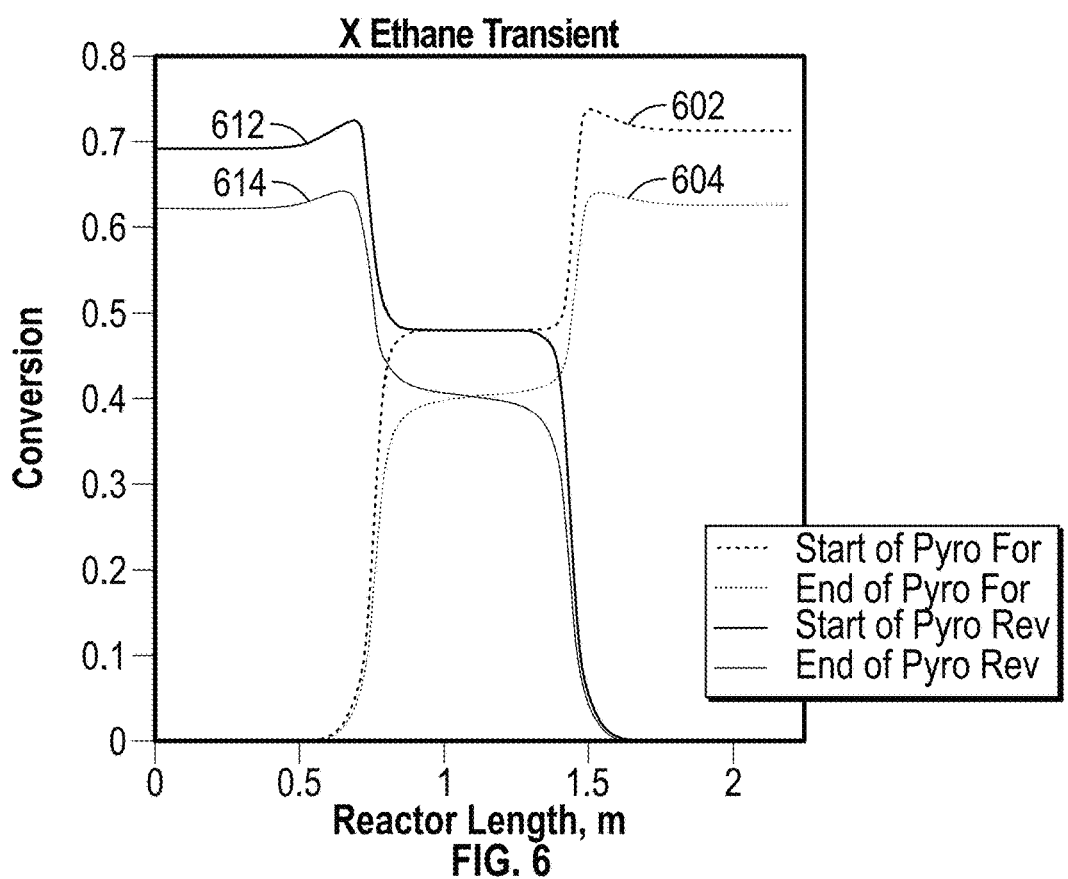
FIG. 6 shows ethane conversion within a reactor based on modeling of a cyclic pyrolysis process with a combustion time of 5 milliseconds during combustion steps.

FIG. 5 and FIG. 6 show results from simulations where the combustion rate constant was selected so that the combustion time is 5 milliseconds. Selecting a combustion time of 5 milliseconds resulted in a total cycle length of 15 seconds. In FIG. 5, the temperature of the solids is shown. As shown in FIG. 5, the short (conventional) combustion time results in a temperature profile with two peaks. This is due to the combustion step in each direction resulting in temperature peak at or near where combustion is initiated.

In FIG. 6, a plurality of curves are shown that track the cumulative amount of conversion that occurs along the length of the reactor at various instances in the reaction cycle. For example, one of the curves (602) shows the cumulative conversion along the length of the reactor at the beginning of the pyrolysis step in the forward direction in the reactor. As shown by curve 602, in the early part of the reactor, the temperature is too low for conversion to occur. As the gas flow progresses through the reactor, at roughly 0.7 meters the amount of conversion rapidly increases to roughly 50 wt % conversion. This corresponds roughly to the location of the first temperature peak in FIG. 5. For curve 602 in FIG. 6, the amount of conversion then remains near 0.5 for a distance, indicating that only a minimal amount of additional conversion occurs in the valley between the temperature peaks in FIG. 5. The gas flow then reaches the location of the second temperature peak in FIG. 5, resulting in the second sharp increase in conversion for curve 602 in FIG. 6. After the second increase, no further conversion occurs due to the gas flow passing into the final portion of the reactor where the temperature is too low for pyrolysis. Similar cumulative conversion profiles are shown for the end of the forward pyrolysis step (curve 604), the beginning of the reverse pyrolysis step (curve 612), and the end of the reverse pyrolysis step (curve 614). shows the resulting ethane conversion levels in the reactor.

Figure 7:
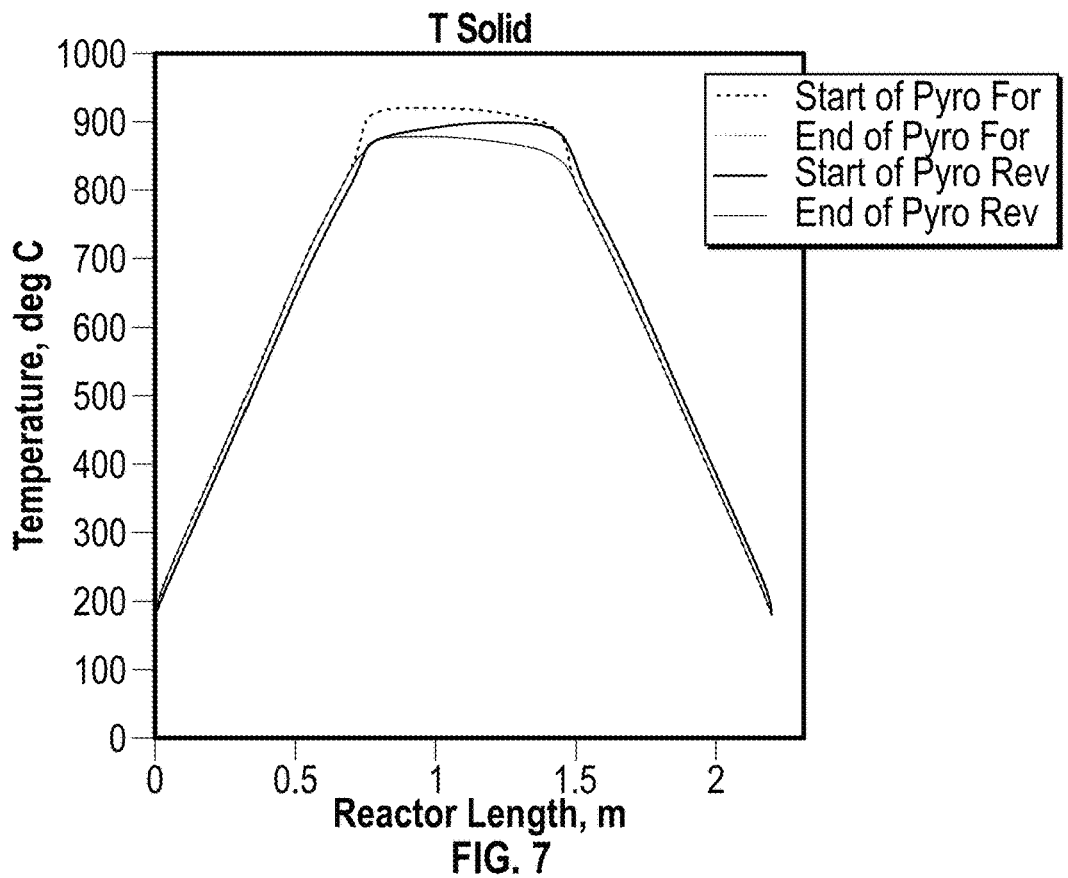
FIG. 7 shows solid surface temperatures within a reactor based on modeling of a cyclic pyrolysis process with a combustion time of 60 milliseconds during combustion steps.
Figure 8:
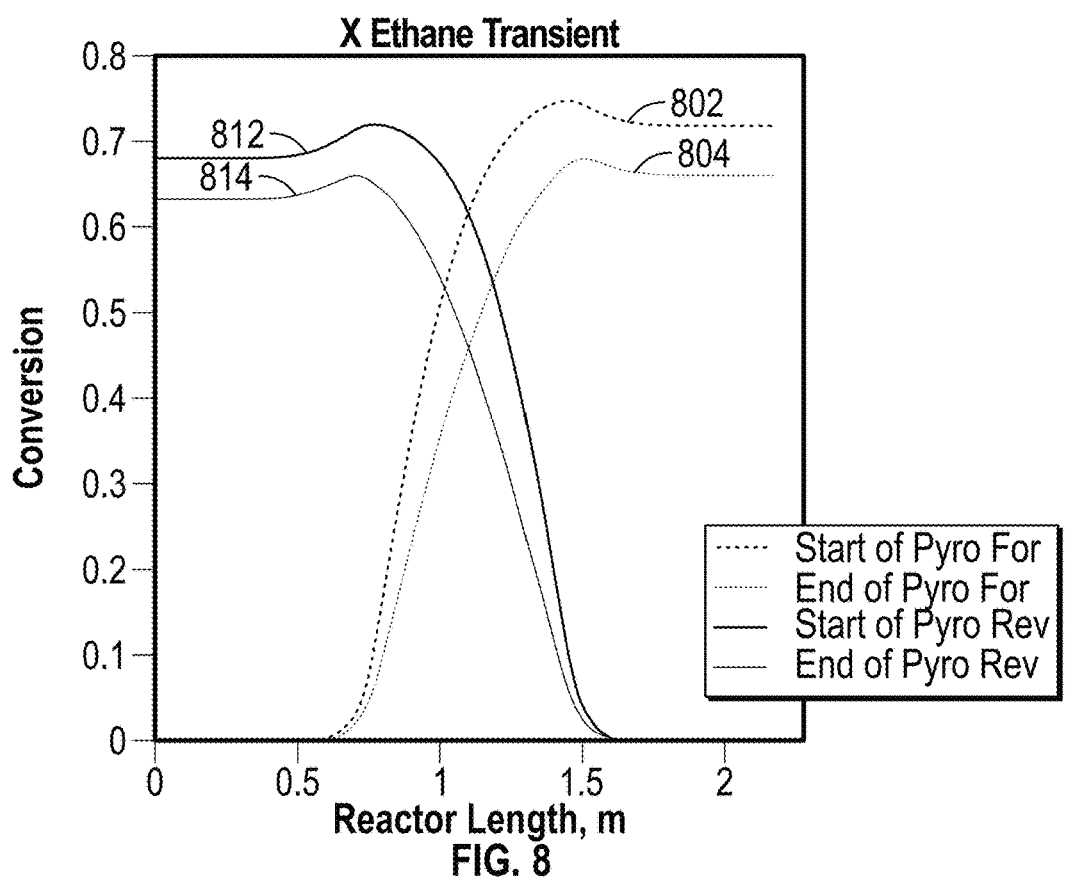
FIG. 8 shows ethane conversion within a reactor based on modeling of a cyclic pyrolysis process with a combustion time of 60 milliseconds during combustion steps.

FIG. 7 and FIG. 8 show results from additional simulations where the combustion rate constant was selected so that the combustion time is 60 milliseconds. This resulted in a total cycle time of 35 seconds. In FIG. 7, the longer combustion time resulted in a substantially more uniform temperature profile. Instead of having two large temperature peaks in the temperature profile, the longer combustion time allows the temperature in the middle of the reactor to be relatively similar to the temperature at the locations where combustion was initiated. In other words, expanding the combustion time results in an expanded combustion volume within the reactor, and therefore increases the volume within the reactor that is heated to a desirable temperature for pyrolysis.

FIG. 8 shows how the cumulative conversion profile within the reactor changes based on the improved temperature profile in FIG. 7. As an example, curve 802 in FIG. 8 shows the cumulative conversion along the length of the reactor at the start of the forward pyrolysis step. Similar to curve 602 in FIG. 6, curve 802 in FIG. 8 shows that initially no conversion occurs in the initial portion of the reactor as the temperature is too low in the initial section. In curve 802, conversion then begins to occur at the location where combustion starts in the temperature profile in FIG. 7. In contrast to FIG. 6, curve 802 does not have a plateau in a middle region between combustion locations. Instead, the amount of cumulative conversion continues to increase until after the gas flow passes the second combustion location. This is due to the improved temperature profile in FIG. 7, where all of the middle section of the reactor is at a sufficient temperature to allow pyrolysis to occur, rather than just having two high temperature peaks with a valley in the middle.

Based on additional simulations, it is noted that combustion times of roughly 25 milliseconds to 60 milliseconds resulted in similar temperature profiles and similar total cycle lengths. Thus, the benefit of extending the combustion time appears to be related to extending the combustion time from a conventional combustion time (of roughly 4 milliseconds to 6 milliseconds) to a combustion time of 25 milliseconds or longer. For combustion times in between 6 milliseconds and 25 milliseconds, a partial benefit from extended combustion time can be achieved.

Example 3—Combustion Time Characterization—Auto-Combustion

The modeling in Example 1 and Example 2 illustrate that a combustion time of greater than 25 milliseconds would be beneficial for providing an improved temperature profile. Based on this, additional model calculations were performed to identify conditions that can provide this desirable combustion time while still achieving substantially complete combustion of the fuel introduced into the reactor.

This example details calculations for auto-combustion of fuel. As illustrated in this example, using auto-combustion of fuel to achieve pyrolysis temperatures in a reactor either results in a substantial temperature spike or potential instability in the combustion location within the reactor.

Figure 9:
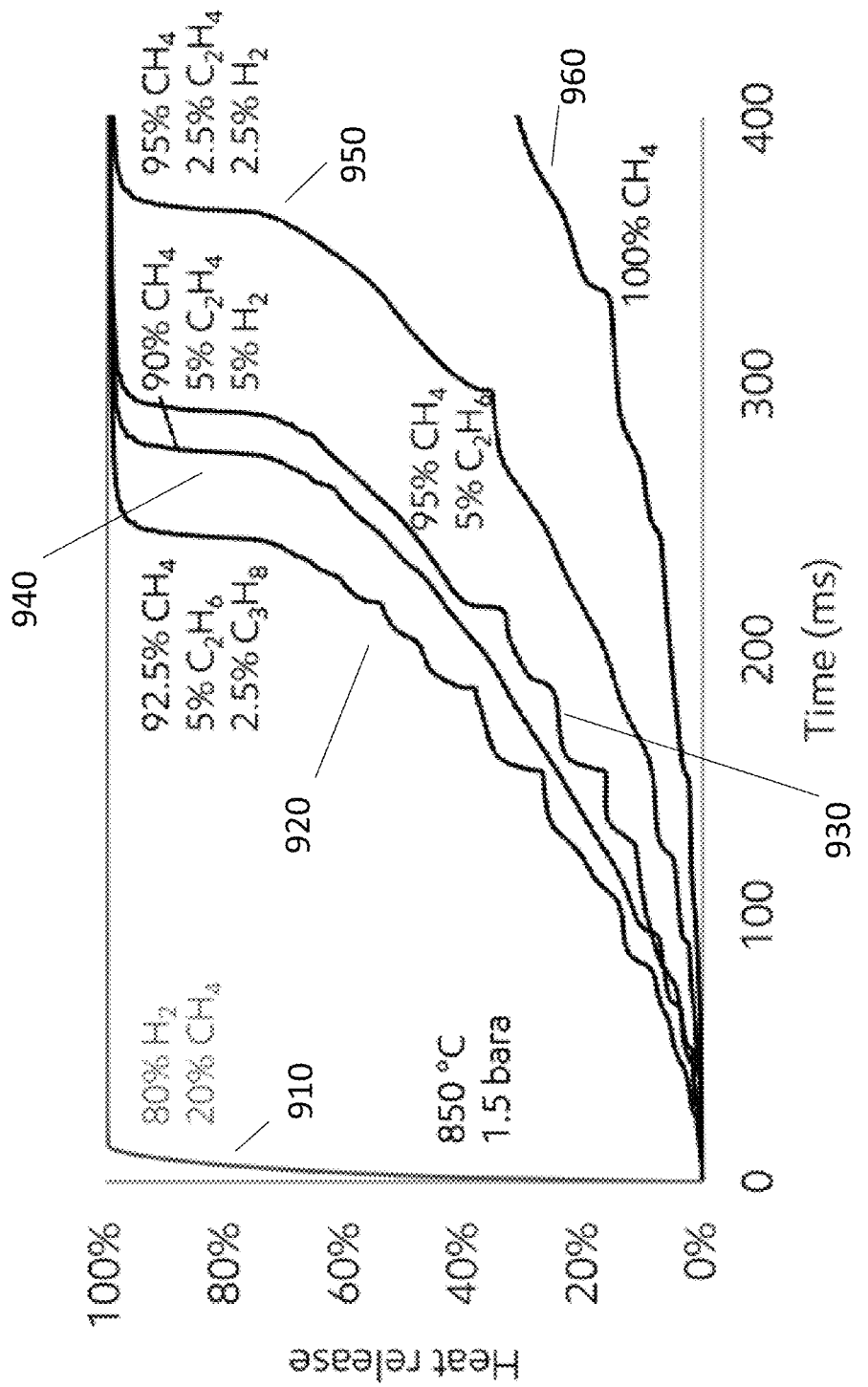
FIG. 9 shows modeled combustion profiles for auto-combustion of various fuels at 850° C.

In this example, a publicly available combustion model was used to determine the combustion profile for various fuel mixtures under auto-combustion conditions. In the model, air and fuel gas are pre-mixed and maintained at 850° C. and 7.5 psig (1.5 bara) pressure. The ratio of air to fuel gas is 1.1 times the equivalence ratio (i.e. the ratio of air to fuel gas at which $O_2$ and fuel gas are completely converted to $CO_2$ and $H_2O$). FIG. 9 shows the combustion profile for auto-combustion of various fuels under these conditions.

First, line 910 shows the combustion profile for a fuel corresponding to 80 vol % $H_2$ and 20 vol % $CH_4$. As shown in FIG. 9, fuel mixtures including more than small amounts of $H_2$ tend to have short combustion initiation times followed by rapid completion of combustion. The fuel mixture corresponding to line 910 has a combustion time (i.e., after initiation) of roughly 5 milliseconds. The combustion profile shown by line 910 has a short initiation time, and therefore would be suitable for achieving substantially complete combustion at a relatively constant starting location within a reactor. However, based on the models in Examples 1 and 2, the combustion time for such a fuel mixture is too short, and therefore a large peak would occur in the resulting temperature profile.

In order to achieve slower combustion time, various fuel mixtures including 90 vol % or more of $CH_4$ were modeled. Methane has significantly higher resistance to auto-combustion than ethane or propane, and therefore was investigated as potentially having the best opportunity for providing a longer combustion time. Line 920 corresponds to a fuel mixture including 5 vol % ethane and 2.5 vol % propane (balance methane). Line 930 corresponds to a fuel mixture including 5 vol % ethane (balance methane). Line 940 corresponds to a fuel mixture including 5 vol % ethane and 5 vol % $H_2$. Line 950 corresponds to a fuel mixture including 2.5 vol % ethane and 2.5 vol % $H_2$. Line 960 corresponds to a fuel including 100 vol % methane. All of lines 920 to 950 share some common characteristics. First, little or no combustion occurs during an initiation period. Combustion then ramps slowly up for a period of time until roughly 40 vol % to 60 vol % of the fuel is combusted. The remaining fuel is then rapidly combusted in a relatively short (less than 10 milliseconds) final combustion period.

As shown in FIG. 9, using a fuel composed primarily of methane results in longer combustion times. However, auto-combustion of such a fuel also poses problems. First, the initiation time for combustion is relatively sensitive to the composition of the fuel. For example, a comparison of lines 920 and 930 shows that addition of a small amount of propane delays the initiation of combustion by roughly 10 milliseconds. Next, line 920 (5 vol % ethane, balance methane) combusts roughly 60 vol % of the fuel over the course of roughly 200 milliseconds. For line 930, achieving the same level of combustion takes closer to 250 milliseconds. Because both the initiation of combustion and the initial, slower portion of combustion are sensitive to feed composition, maintaining a desirable level of control over the location of combustion would be difficult in a commercial scale reactor. Additionally, the final 40 vol % of fuel is still combusted relatively rapidly (less than 10 milliseconds). Even though the overall combustion time is long, a temperature spike would still likely occur due to having 40 vol % of the fuel combusted over a short time scale, while the remaining fuel is slowly combusted over a much longer time scale.

It is noted that the fuel composed of only methane provides a slightly different problem. As shown by line 960, the combustion of the 100 vol % methane feed remains slow over the entire time period shown in FIG. 9. In addition to potentially causing problems with controlling the location where combustion occurs, this type of combustion profile also indicates that complete combustion might not occur within the reactor.

Example 4—Catalytic Combustion—Constant Catalyst Density

Catalytic combustion can potentially provide a way to overcome the difficulties shown in Example 3 for auto-combustion of fuel. However, as illustrated in this example, simply including a combustion catalyst is not sufficient to achieve all of the goals of heating for a pyrolysis reaction while reducing or minimizing temperature spikes in the reactor temperature profile. Instead, a catalyst system with a suitable catalyst gradient can be used to provide an improved temperature profile.

As a first test, a model similar to the model used in Example 2 was used to investigate using a catalyst system with a constant catalyst density. In the model reactor, there are 0.8 m of inert diluent at each end of the reactor, with the remaining middle portion of the reactor corresponding to spheres of catalyst. The diluent spheres and the catalyst spheres were both modeled as 9.6 mm spheres for purposes of the fluid flow portions of the model calculations. The diluent spheres had a combustion activity of zero. For the catalyst, the combustion rate was selected so that 99.99 vol % of the fuel was combusted by the time the fuel reached the far end of the catalyst system. In other words, using a constant catalyst density, the catalyst activity was set to the minimum value that still provide substantially complete combustion. This represents a limiting case, as any further reduction in the catalyst activity for the catalyst system would result in incomplete fuel combustion.

Table 1 shows a comparison of a) results from a simulation based on Example 2 where the combustion time was roughly 33 milliseconds, and b) results from the simulation where the catalyst activity is just sufficient to achieve complete combustion. As noted in Example 2, simulations with combustion times between 30 milliseconds and 60 milliseconds all provided similar results in terms of temperature profile within the reactor.

TABLE 1

| Catalytic Combustion with Constant Catalyst Density | | |
|---|---|---|
| Example | Example 2 | Example 4 |
| Combustion time (msec) | 33 | Equivalent to 8-10 msec |
| Cycle time (sec) | 40 | 22 |
| Steam use, wt ratio steam/feed | 0.09 | 0.16 |
| Peak Temp (° C.) | 908 | 1009 |
| Temp Swing (° C. per sec) | 2.2 | 7.5 |

As shown in Table 1, by setting the catalyst activity to the minimum value that achieves complete combustion, a catalyst with a constant catalyst density resulted in a combustion time that is equivalent to roughly 8-10 milliseconds or less (i.e., the time between 5% conversion and 95% conversion of the fuel is 8-10 milliseconds). However, achieving 99.99 vol % combustion requires the rest of the reactor, due to lower combustion rates as fuel is depleted. Achieving this level of combustion is valuable in order to avoid the need to have additional processing equipment for combustion of any remaining fuel in the combustion flue gas.

As shown in Table 1, using a catalyst with the minimum activity for achieving substantially complete combustion results in substantially larger peak temperatures when compared with a longer combustion time. Thus, even in the limiting case of a catalyst with the minimum catalyst activity for complete combustion, the resulting temperature profile still has a substantial peak, resulting in larger temperature swings. This indicates that another option is needed to achieve an improved temperature profile.

Example 5—Combustion with Catalyst Density Gradient

In Example 4, a constant catalyst density was used. It is noted that a constant catalyst density does not correspond to a constant rate of fuel combustion. Instead, rapid combustion occurs when fuel first contacts the catalyst, with the rate decreasing as fuel becomes depleted.

Instead of using a constant catalyst density, a catalyst system can be used with a catalyst density gradient. The catalyst density gradient can allow the fuel to initially be exposed to a low catalyst density. This results in a first rate of fuel combustion. As the fuel becomes depleted, the rate of fuel combustion would decrease if the catalyst density remained constant. However, by increasing the catalyst density, an increase in the combustion rate can be achieved. This can allow the rate of fuel combustion to be more uniform across a longer time/a larger volume. Using a catalyst density gradient does not necessarily result in a uniform combustion rate; rather, the catalyst density gradient only needs to reduce the non-uniformity in the combustion rate in order to improve the temperature profile.

An additional benefit of using a catalyst density gradient is that a higher activity catalyst can be used. Using a higher activity catalyst, an relatively low catalyst density can be used when the fuel initially contacts the catalyst. This can allow combustion to start while avoiding complete combustion on a short time scale. At a later time, when the catalyst density is higher, sufficient catalyst can be used so that substantially complete combustion is achieved quickly even as the fuel becomes depleted. This can allow complete combustion to occur within the desired portion of the reactor. It is noted that by combusting a sufficient amount of the fuel in early portions of the catalyst system, using a high catalyst density to complete combustion can be acceptable, as the smaller amount of remaining fuel can be rapidly combusted without causing a substantial temperature peak.

To investigate the impact using a catalyst system with a catalyst density gradient, a model similar to Example 4 was constructed, but with a different type of catalyst system. Instead of using a constant density of lower activity catalyst, a higher activity catalyst was used but loaded in a manner that provided a catalyst density gradient. The gradient was achieved by loading the catalyst system in layers. Lower catalyst density values were achieved by mixing the combustion catalyst with larger amounts of inert particles (diluent). Both catalyst particles and diluent (inert) particles had a size of 9.6 mm. For layers where a mixture of diluent and catalyst particles were present, instead of having an idealized distribution of catalyst particles, the layer was modeled so that the distribution of catalyst particles in diluent followed a binomial distribution (as would be expected for a real system). In this example, the middle catalyst layer corresponded to only combustion catalyst particles, but in other configurations some diluent could also be included in the middle layer and/or the layer with the highest catalyst density. Table 2 shows the catalyst loading that was modeled. In Table 2, the loading is described based on a reactor where the catalyst layers are loaded from top to bottom, along the axis of fluid flow within the reactor. The depth where the layer starts is provided, along with the percentage of particles in the layer that correspond to combustion catalyst.

TABLE 2

Catalyst Loading for Catalyst System with Catalyst Density Gradient

| Layer # | Depth to start layer (m) | Percentage catalyst in layer |
|---|---|---|
| 1 | 0 | 0% |
| 2 | 0.73 | 9% |
| 3 | 0.92 | 19% |
| 4 | 1.06 | 100% |
| 5 | 1.14 | 20% |
| 6 | 1.28 | 10% |
| 7 | 1.47 | 0 |

It is noted that the catalyst system described in Table 2 is not quite symmetric. This can contribute to having a temperature profile in a reactor that is also not symmetric, but having perfect symmetry is not necessary. Instead, the goal is to reduce or minimize temperature peaks, so that the peak temperature within the reactor is below 1000° C. while still achieving pyrolysis within the reactor. Additionally, it is noted that the catalyst density profile corresponds to having relatively low catalyst density in two layers followed by the middle layer with 100 vol % combustion catalyst. After encountering the initial two layers including combustion catalyst, the substantial majority of fuel can already be combusted. The significantly higher catalyst density in the middle layer can then be used to achieve substantially complete combustion. It is noted that the above density profile is for a reactor where fuel is introduced from both directions. Thus, even if a relatively small portion of fuel remains not combusted by the time the fuel reaches the middle catalyst layer, there will be fuel reaching that layer during both combustion steps, while the other catalyst layers will combust fuel from only one direction (since all fuel will be depleted after the flow passes the middle layer).

Figure 10:
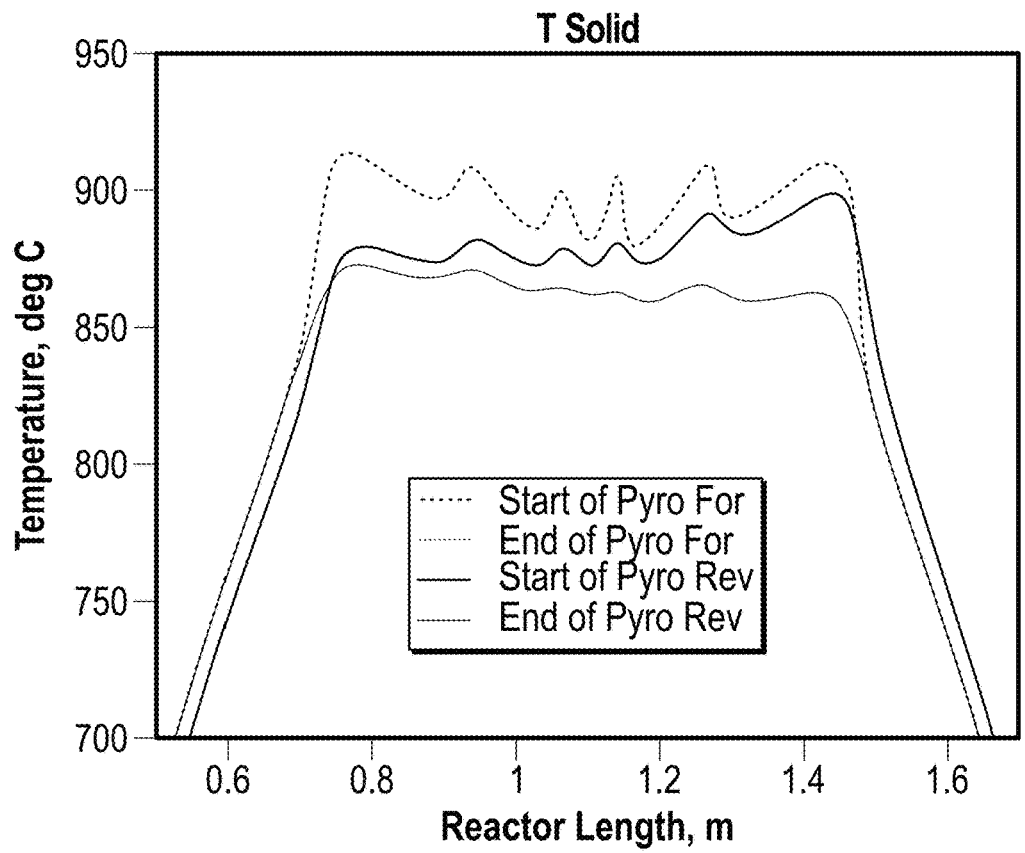
FIG. 10 shows solid surface temperatures within a reactor based on modeling of a cyclic pyrolysis process when combustion is performed in the presence of a catalyst system with a catalyst density gradient.
Figure 11:
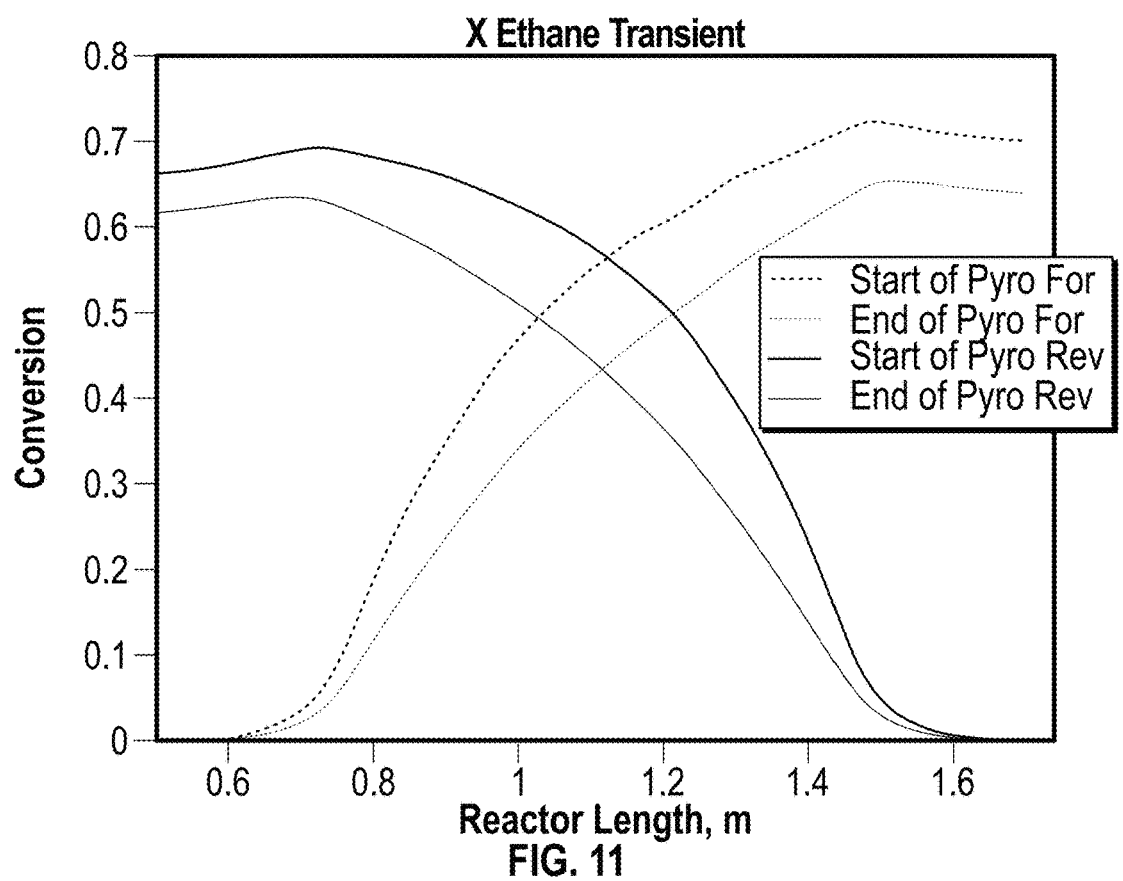
FIG. 11 shows ethane conversion within a reactor based on modeling of a cyclic pyrolysis process when combustion is performed in the presence of a catalyst system with a catalyst density gradient.

The catalyst loading in Table 2 was modeled in a reactor that was otherwise similar to the reactor from Example 2. FIG. 10 shows the steady-state temperature profile from the simulation, while FIG. 11 shows the ethane conversion. As shown in FIG. 10, peaks are still present in the temperature profile, but the size of the peaks is greatly reduced so that the difference between the peak temperature and average temperature in the middle portion of the reactor is roughly 40° C. or less. As a result, temperatures desirable for performing pyrolysis are achieved while still having a peak temperature in the reactor that is below 950° C. FIG. 11 shows that even though there are peaks in the temperature profile, the resulting ethane conversion as a function of reactor location is similar to the ethane conversion profile shown in FIG. 8, where an idealized combustion reaction with a length of 30 milliseconds or more was used. Thus, FIG. 10 and FIG. 11 demonstrate that a catalyst system with a suitable catalyst density gradient can be used to achieved an improved temperature profile for a pyrolysis reaction while still achieving substantially complete fuel combustion. A further comparison is provided in Table 3, which compares the modeled reaction shown in FIG. 10 and FIG. 11 with the modeled reaction shown in FIG. 7 and FIG. 8.

TABLE 3

Catalytic Combustion with Catalyst Density Gradient

| Example | Example 2 | Example 5 |
|---|---|---|
| Cycle time (sec) | 40 | 33 |
| Steam use, wt ratio steam/feed | 0.09 | 0.1 |
| Peak Temp (° C.) | 908 | 916 |
| Temp Swing (° C. per sec) | 2.2 | 2.9 |

Example 6—Catalyst Density Gradient and Particle Distribution

In Example 5, a catalyst density gradient was achieved by mixing combustion catalyst particles with diluent (inert) particles prior to loading. In a simulation, such a mixture could have been modeled as an ideal mixture, so that all catalyst particles are evenly distributed throughout a mixture. For a simulation, the same result could be achieved by having particles that contain varying amounts of catalyst and diluent material, rather than mixing catalyst particles with diluent particles. While both options can achieve the same result, from a manufacturing perspective, it is often simpler to make one type of catalyst particle and one type of diluent particle and then pre-mix the particles in a desired ratio.

In practice, unfortunately, creating a mixture of a small number of catalyst particles in a larger number of diluent particles can result in uneven distribution of catalyst particles within the mixture. This can be understood by considering the nearest neighbor particles for each catalyst particle in a mixture. In an idealized situation (such as a model), the number of nearest neighbor catalyst particles for each catalyst particle could be set to match the average value for the mixture. For a real system, however, the number of neighboring catalyst particles will follow a binomial distribution. As an example, in a mixture where 9 vol % of the particles are catalyst particles, the average or expected value of nearest neighbor catalyst particles for each catalyst particle should be roughly 1.0. However, based on a binomial distribution, only around 38% of catalyst particles will have this expected or average value. Almost as many catalyst particles will have no other catalyst particles as nearest neighbors, and around 10% of catalyst particles will have 3 nearest neighbor catalyst particles. At second nearest neighbor and third nearest neighbor distances, the increase in length scale results in lower amounts of deviation from the average value. However, even this type of short distance local variation can impact the temperature profile in the reactor.

To investigate the impact of short length scale variations in catalyst distribution, additional simulations were performed using additional catalyst systems. In the additional catalyst systems, the 100% diluent layers were split. Part of the diluent layer corresponded to the 9.6 mm particles used in Example 5, while the other portion of the diluent layer (adjacent to the catalyst layers) included the same size particles in the catalyst-containing layers. The layers containing catalyst were modified to use smaller diameter catalyst particles and diluent particles. In the additional simulations, the catalyst layers included catalyst particles with a diameter of 6.5 mm or 4.5 mm.

All of the sizes of catalyst particles resulted in similar cycle times and performance for the pyrolysis reaction based on the model. However, the peak temperature in the reactor was reduced from roughly 920° C. to roughly 910° C. by reducing the particle size (which therefore increased the number of catalyst particles in a layer). Thus, based on catalyst distribution considerations, some additional reduction in peak temperature may be possible by using smaller catalyst particles.

Example 7—Inert Materials

An experimental test apparatus was constructed corresponding to a quartz, fixed bed reactor heated with an electric furnace. The reactor was used to investigate potential inert or diluent materials for mixing with combustion catalyst. The reactor had an inner diameter of 8 mm. The heated length was about 8 inches. The reactor is loaded with about 20 gram of either quartz chips or alumina chips of size 40-60 mesh (0.25-0.42 mm). After loading the reactor, a gas flow was established comprising 0.20 sL/min of 10% $O_2/N_2$ and 0.010 sL/min of fuel gas. The fuel gas was composed of either 95% $CH_4$ and 5% He (denoted "$CH_4$") or 85% $CH_4$, 5% $H_2$, 5% $C_2H_4$, 5% He (denoted "$CH_4/H_2/C_2=$"). The reactor was maintained at several pressures and temperatures noted in FIG. 12. The residence time of gas in the heated length of the reactor was roughly 300-400 ms, which is notably longer than the design target in Example 5 of ~30 ms, but was the lowest level that could be achieved by the test apparatus.

Figure 12:
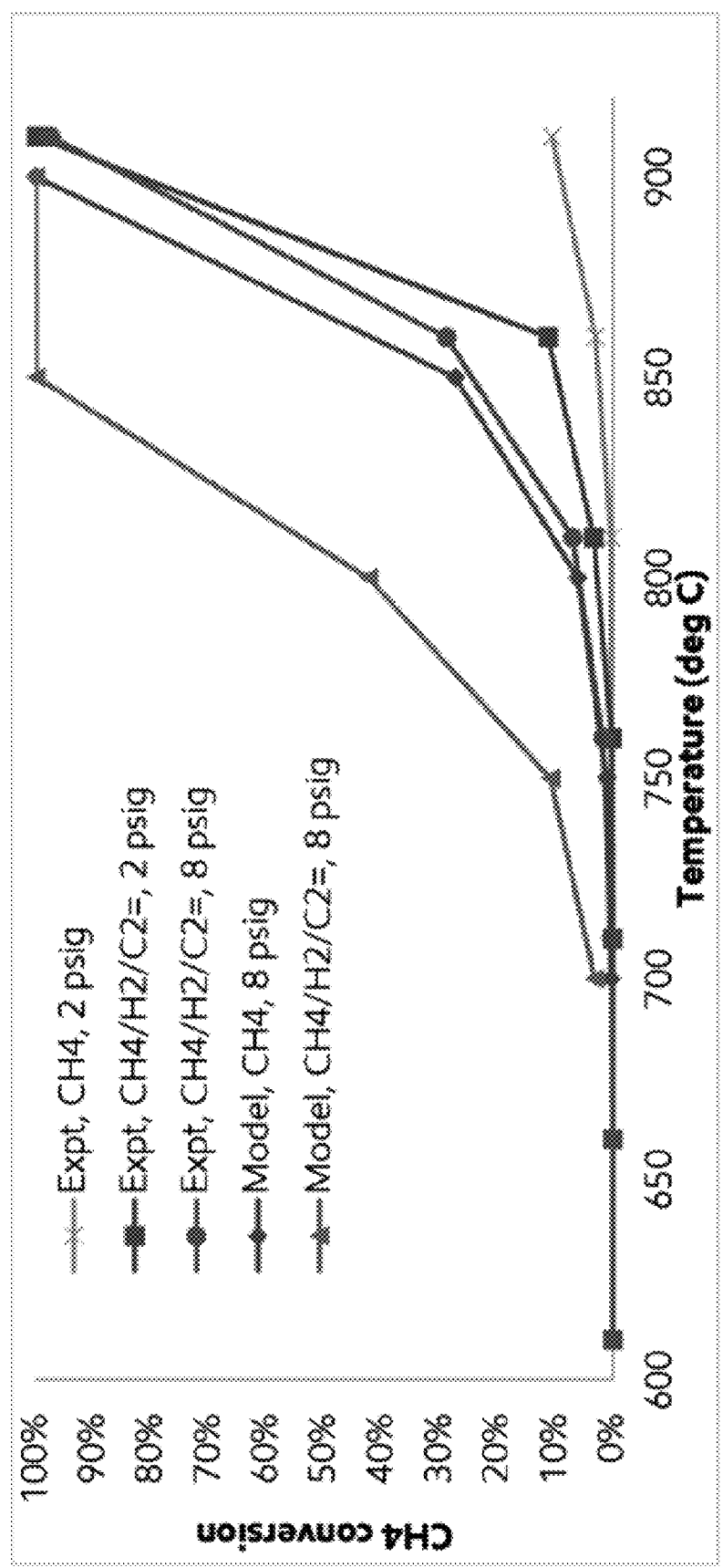
FIG. 12 shows conversion of methane by auto-combustion under various conditions.

The results in FIG. 12 show the $CH_4$ conversion (combustion) at various temperatures. In the experiments, all fuels show relatively low conversion at temperatures below that observed for ethane pyrolysis (which is about 850° C. in this reactor at an ethane flow of 0.2 sL/min). The $CH_4$ fuel gas showed the lowest conversion and highest stability against thermal runaway, even at temperatures significantly above that of pyrolysis. The $CH_4/H_2/C_2=$ fuel also showed low $CH_4$ conversion, but the conversion increased significantly at temperature just above that needed for thermal pyrolysis. The conversion of $CH_4/H_2/C_2=$ was also affected by pressure, with the conversion approximately doubling as pressure was raised from 2 psig to 8 psig. Another observation is that the fuel gas conversion predicted by the combustion model was higher than that observed in the experiment, suggesting that the combustion system is further from the auto-ignition point than predicted by the model. Overall, these results suggest that quartz is a suitably inert material for use as inert packing. The results also confirm that methane-rich fuel gas is inert to combustion at temperatures up to that required for pyrolysis, and highlight the value of higher purity methane streams when an auto-combustion resistant fuel is desired.

With regard to alumina, additional experimental runs showed that alumina had slightly greater activity for methane combustion than quartz, but alumina still had acceptably low activity for use as an inert material, particularly when a fuel gas is exposed to elevated temperatures for time periods of 30 milliseconds or less prior to exposure to a combustion catalyst. Additionally, it is believed that alumina could be optionally modified with an alkali metal, an alkaline earth metal, or silicon, to further reduce the activity for catalyzing combustion.

Examples 8 to 18—Examples of Combustion Catalyst Materials

A series of different catalytic materials were prepared in order to compare the combustion activity of the materials. The catalytic materials corresponded to combinations of Mn, Y, Mg, and Ca. In some examples, the catalytic materials were supported and/or washcoated on a support oxide, such as alumina.

Example 8: Mn—Y catalyst (powder). 4.5 g of Yttrium (III) oxide was ball-milled with 0.3 g of Manganese(III) oxide.

Example 9. Mn—Y catalyst (powder). 30.6 g of Yttrium (III) nitrate hexahydrate and 2.9 g of Mn(II) nitrate tetrahydrate were dissolved in water. To this metal salt solution, ammonium hydroxide solution was then added until the pH of the metal salt solution reached about 9. A precipitate was filtered and treated at 750° C. in air.

Example 10. Mn—Y catalyst (powder). 13.5 g of Yttrium (III) acetate tetraahydrate was ball milled with 1.4 g of Mn(II) acetate tetrahydrate. The solids were then treated at 750° C. in air.

Example 11. Mn—Y catalyst (powder). 30.6 g of Yttrium (III) nitrate hexahydrate and 2.9 g of Mn(II) nitrate tetrahydrate were dissolved in water. To this metal salt solution, a second solution of 10.4 g ammonium carbonate in water was added. A precipitate was filtered and treated at 750° C. in air.

Example 12. Y—Al catalyst (Y on alumina support). 0.98 g of Yttrium(III) acetate tetrahydrate was dissolved in 10 mL water and added to 13.1 g of alumina chips (40-60 mesh). The mixture was heated at 60° C. in vacuum until the water was removed. The sample was then heated at 750° C. in air. It is noted that this catalyst was prepared on an alumina support in order to allow comparison of yttrium as the sole catalytic material with various types of combinations of manganese with yttrium.

Example 13. Mn—Y catalyst (powder). 11.5 g of Yttrium (III) nitrate hexahydrate and 15.1 g Manganese(II) nitrate tetrahydrate were dissolved in water and added to an aqueous solution comprising 10.7 g of ammonium carbonate. A precipitate was filtered and treated at 750° C. in air.

Example 14. Mn—Y catalyst (powder). 27.2 g of Yttrium (III) nitrate hexahydrate and 5.7 g of Mn(II) nitrate tetrahydrate were dissolved in water. To this metal salt solution, ammonium hydroxide solution was added until the pH of the metal salt solution reached about 9. A precipitate was filtered and treated at 750° C. in air.

Example 15. Mn—Y catalyst (Mn—Y washcoated on alumina) The Mn—Y powder of Example 8 was washcoated on alumina in the form of ⅛ in (3 mm) diameter spheres. The loading was 2 wt. % Mn—Y relative to the weight of the support.

Example 16. Mn—Y catalyst (Mn—Y washcoated on alumina) The Mn—Y powder of Example 9 was washcoated on alumina in the form of ⅛ in (3 mm) diameter spheres. The loading was 3 wt. % Mn—Y relative to the weight of the support.

Example 17. Mn—Mg catalyst (Mn—Mg washcoated on alumina) 3.2 g of magnesium oxide was ball-milled with 0.3 g of Manganese(III) oxide. The Mn—Mg powder was washcoated on alumina in the form of ⅛ in (3 mm) diameter spheres. The loading was 7 wt. % Mn—Mg relative to the weight of the support.

Example 18. Mn—Ca catalyst (Mn—Ca washcoated on alumina) 3.0 g of calcium oxide was ball-milled with 0.3 g of Manganese(III) oxide. The Mn—Ca powder was washcoated on alumina in the form of ⅛ in (3 mm) diameter spheres. The loading was 2 wt. % Mn—Ca relative to the weight of the support.

Example 19—Activity of Materials for Methane Combustion

Figure 13:
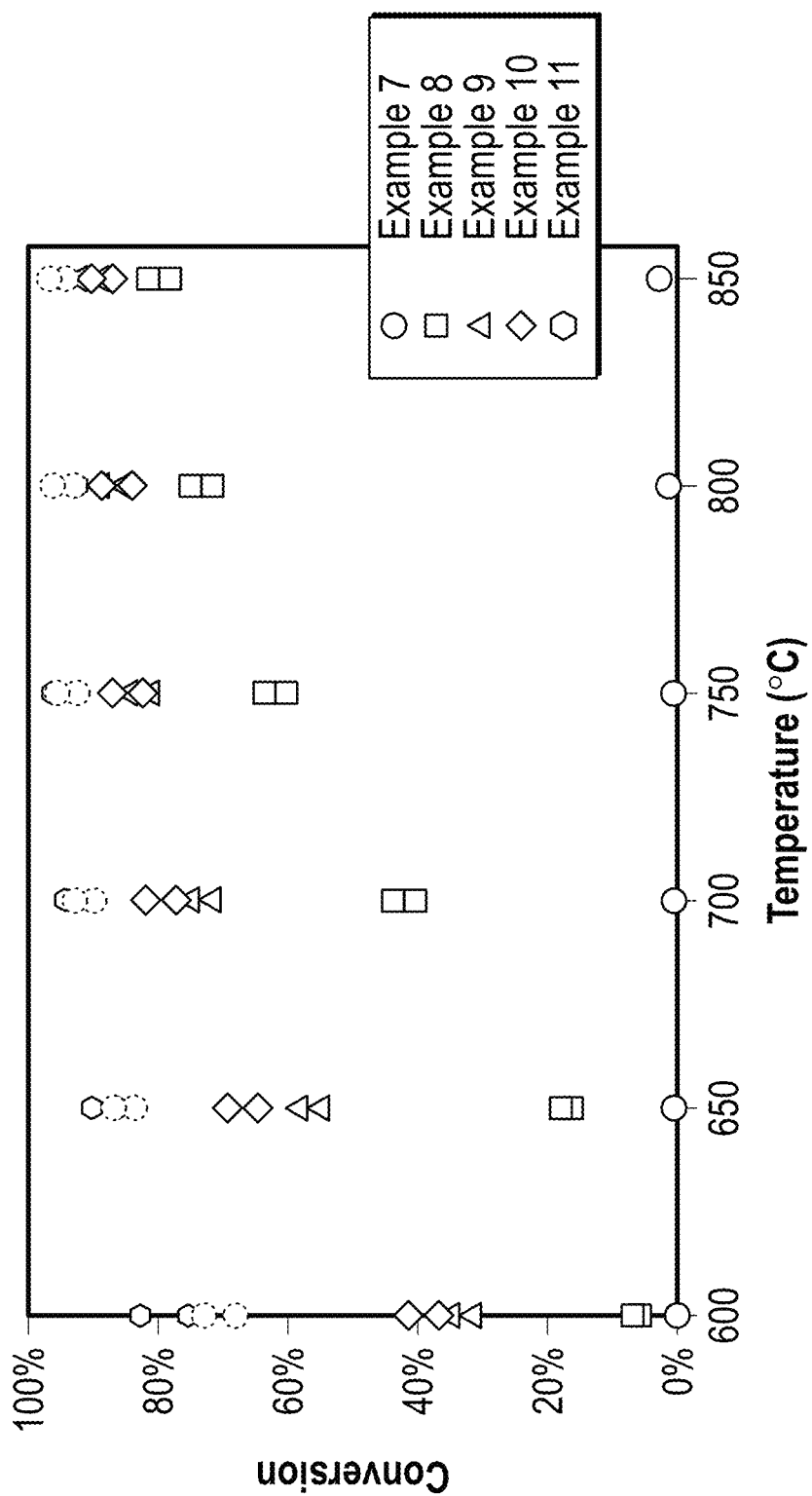
FIG. 13 shows conversion of methane by combustion in the presence of various types of combustion catalysts.

The materials of Examples 8-12 were tested by a protocol similar to what was used for characterizing quartz activity in Example 7. For Examples 8-11, ~100 mg of material was mixed with quartz chips of size 40-60 mesh (0.25-0.42 mm) and loaded in the bed. For Example 12, the bed was filled with ~13 gram of material, which corresponds to roughly 100 mg of $Y_2O_3$. The fuel was $CH_4$. The results for Examples 8-11 are shown in FIG. 13. All materials show activity for methane combustion. However, Example 8 shows inferior activity and Example 11 shows the best activity. (Example 12, not shown, has similar activity to Example 11.) It is believed that this is related to the surface area of the material, which is increased in the co-precipitation methods of Examples 9, 10 and especially 11-12. Nonetheless, all these materials give nearly complete methane combustion at the conditions of interest (temperature of 850° C. or higher). For comparison, results using the inert quartz material from Example 7 are also shown.

Examples 12-14 were also tested for the extent of carbon deposits during pyrolysis. In this test, the reactor was loaded with 100 mg of Examples 13-14 or 13 gram of Example 12. Examples 13-14 were diluted with quartz to achieve the same occupied volume as Example 12. The reactor was maintained at roughly 850° C. and 5 psig (~34 kPa-g). Ethane was flowed at 200 std $cm^3$/min or a residence time of roughly 0.4 seconds. After ~70 s, the ethane flow was stopped and replaced by argon flow at 200 std $cm^3$/min. After 2 minutes, the argon flow was stopped and replaced with a flow of 10% $O_2/N_2$ at 200 std $cm^3$/min.

Figure 14:
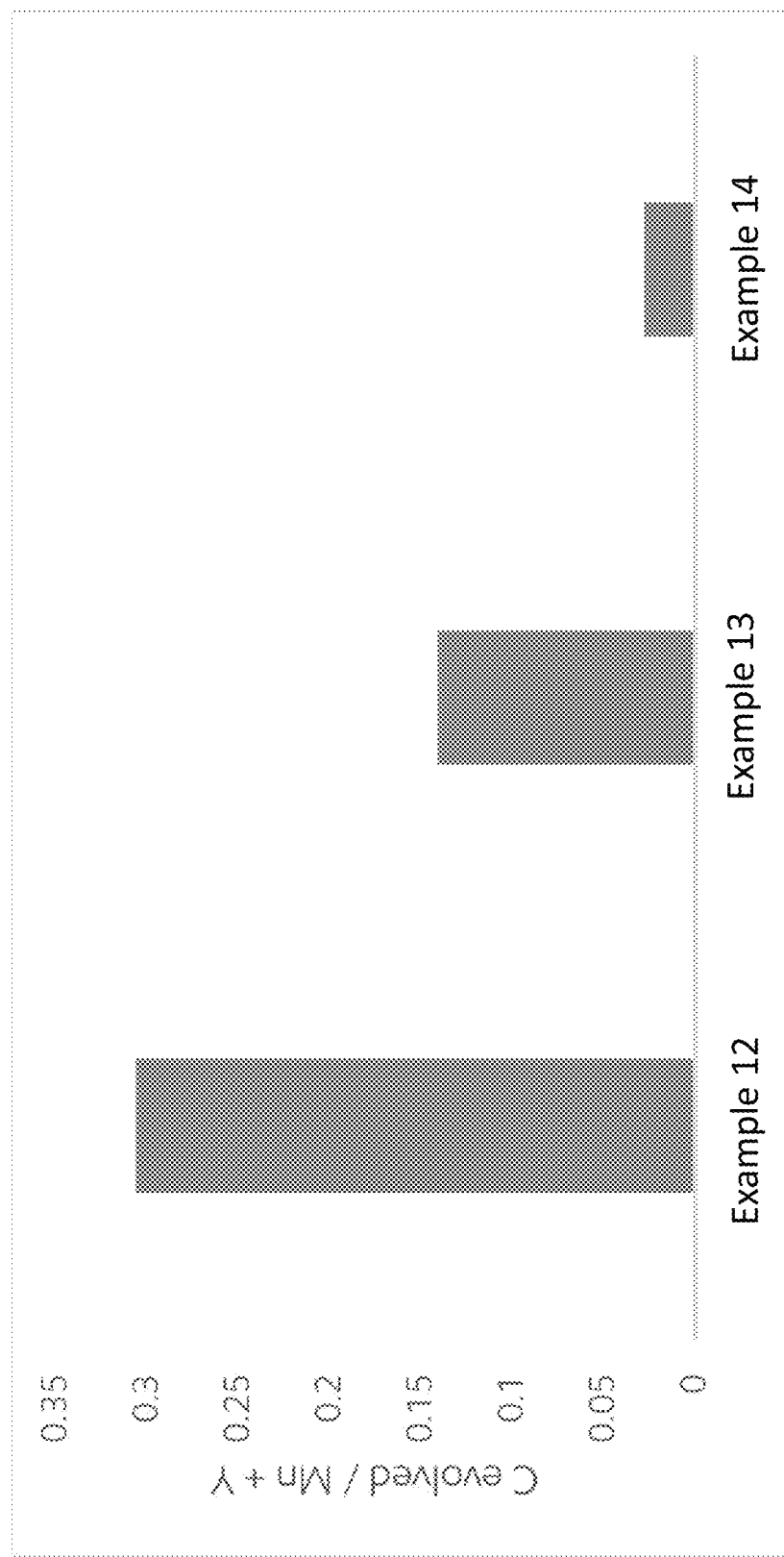
FIG. 14 shows coke accumulation on supported combustion catalysts.

FIG. 14 shows the total amount of CO and $CO_2$ that were evolved during 02 flow in a ratio with the amount of Y+Mn in the reactor for Examples 12-14. The evolved CO and $CO_2$ were interpreted to result from coke burned out of the reactor. The results show that pure Y yields the most coke and that the coke levels decrease as more Mn is added to the reactor. These results highlight the advantage of Y—Mn formulations, which give reduced coke relative to pure Y formulations.

Figure 15:
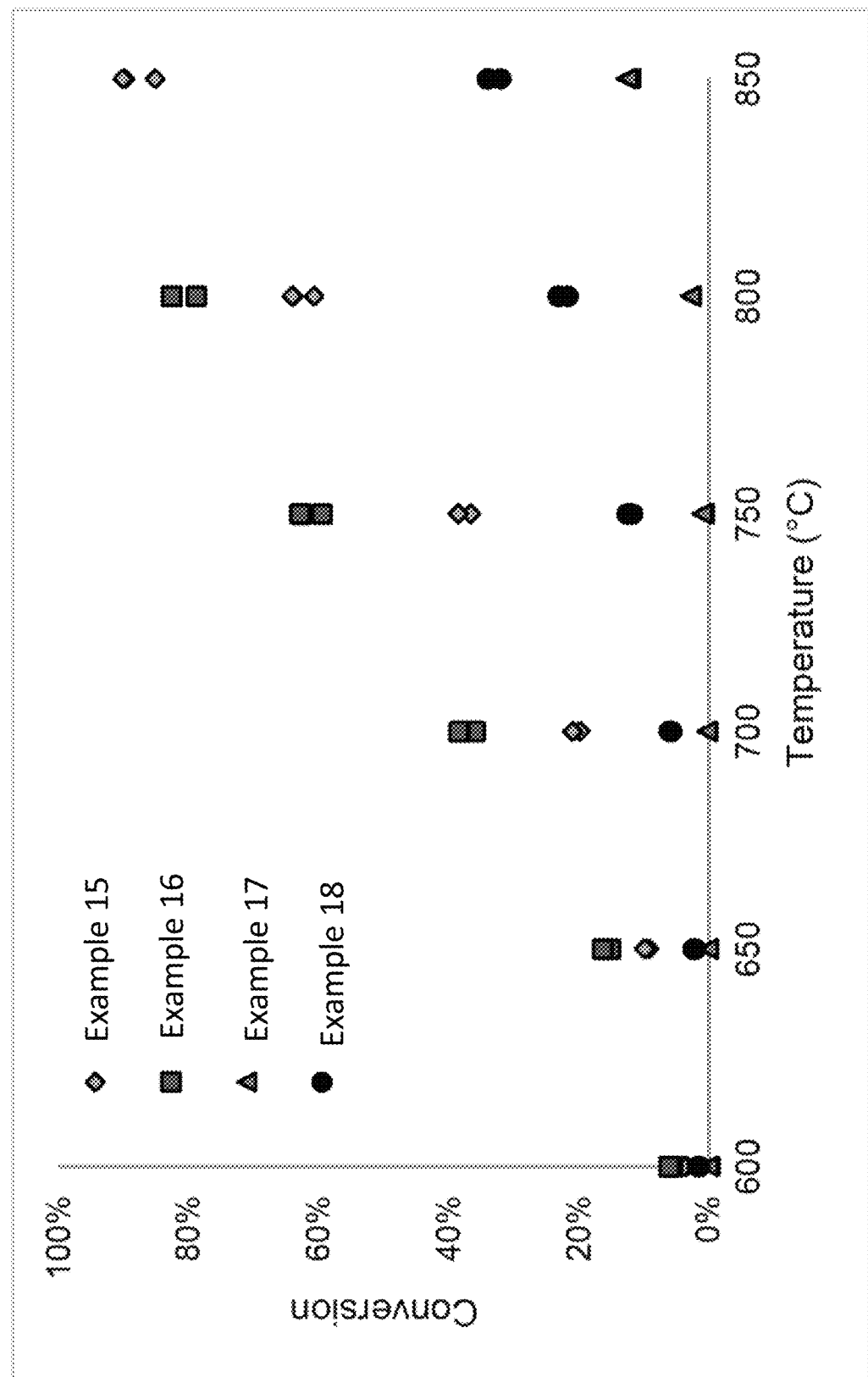
FIG. 15 shows conversion of methane by combustion in the presence of various supported combustion catalysts.

Examples 15-18 were tested by a similar protocol. The bed was loaded with ~5 gram of each Example. Quartz chips of size 40-60 mesh (0.25-0.42 mm) were then loaded above the test material to achieve a total bed size similar to Examples 8-14. The fuel was $CH_4$. The results are shown in FIG. 15. The materials have varying activity for $CH_4$ combustion. Example 15 and 16 with Mn—Y show the best activity, whereas Examples 17 and 18 show inferior activity. The results show that Mn—Y is a superior catalyst for $CH_4$ combustion and that it remains functional when washcoated on the exterior surface of a dense sphere. It is noted that porous support materials might provide still further benefits by improving the attrition resistance of the catalyst. This could potentially also lead to increased catalyst coking, but this trade-off could be beneficial in order to mitigate attrition.

Example 20—Comparison of Catalytic Combustion and Auto-Combustion for Pyrolysis

In this example, a pilot scale reactor was used to compare the products from performing pyrolysis using auto-combustion (Example 19) versus catalytic combustion (Example 20) for the heating step. This example does not make use of a catalyst density gradient, but it does illustrate that catalytic combustion can be used to generate a steady-state temperature profile in an RFR that can be used for pyrolysis.

In Example 20, a pilot scale reactor was configured to use catalytic combustion for the heating step. The pilot unit reactor was 12.5 inches in length and 2.5 inches in diameter. The reactor was loaded with alumina monolith comprising 35% open frontal area, 250 cell/$in^2$, and a packed density of ~2.1 g/$cm^3$. The monolith between depths of 4 and 8 inches into the reactor was coated with a Pt/Pd/La—$Al_2O_3$ catalyst at a loading of 0.5 g/L Pt/Pd. A flow sequence was established based on the following reaction cycle steps: 1) a fuel gas flow corresponding to 3.5 sL/min methane and 60 sL/min air (pre-mixed) in the downward direction at 3 psig for 12 seconds; 2) purge of 30 sL/min nitrogen in the downward direction at 3 psig for 1 second; 3) pyrolysis flow of 38 sL/min ethane in the upward direction at 15 psig for 8 seconds; purge of 30 sL/min nitrogen in the upward direction at 15 psig for 1 second.

As a comparative example, in Example 19, the pilot scale reactor was configured to perform pyrolysis using auto-combustion during the combustion step of the reaction cycle. The pilot unit reactor was 12.5 inches in length and 2.5 inches in diameter. The reactor was loaded with alumina monolith comprising 25% open frontal area, 100 cell/$in^2$, and packed density of ~2.1 g/$cm^3$. Between a depth of 4 and 6 inches, the reactor was loaded with a plate fuel-air mixer composed of silicon carbide. A flow sequence was established based on the following reaction cycle steps: a) an oxygen-containing purge of 50 sL/min air, and 19 sLm nitrogen in the downward direction at 3 psig for 1.6 seconds; b) a fuel gas flow of 17.5 sL/min hydrogen, 50 sL/min air, and 19 sLm nitrogen in the downward direction at 3 psig for 4.9 seconds. It is noted that due to the rapid auto-combustion properties of $H_2$, the $H_2$ was segregated from the air by using separate piping to transport the $H_2$ until just before the desired combustion location; c) a pyrolysis flow of 36 sL/min ethane in the upward direction at 15 psig for 4.9 seconds; and d) a purge flow of 30 sL/min nitrogen in the upward direction at 15 psig for 1 second.

Figure 16:
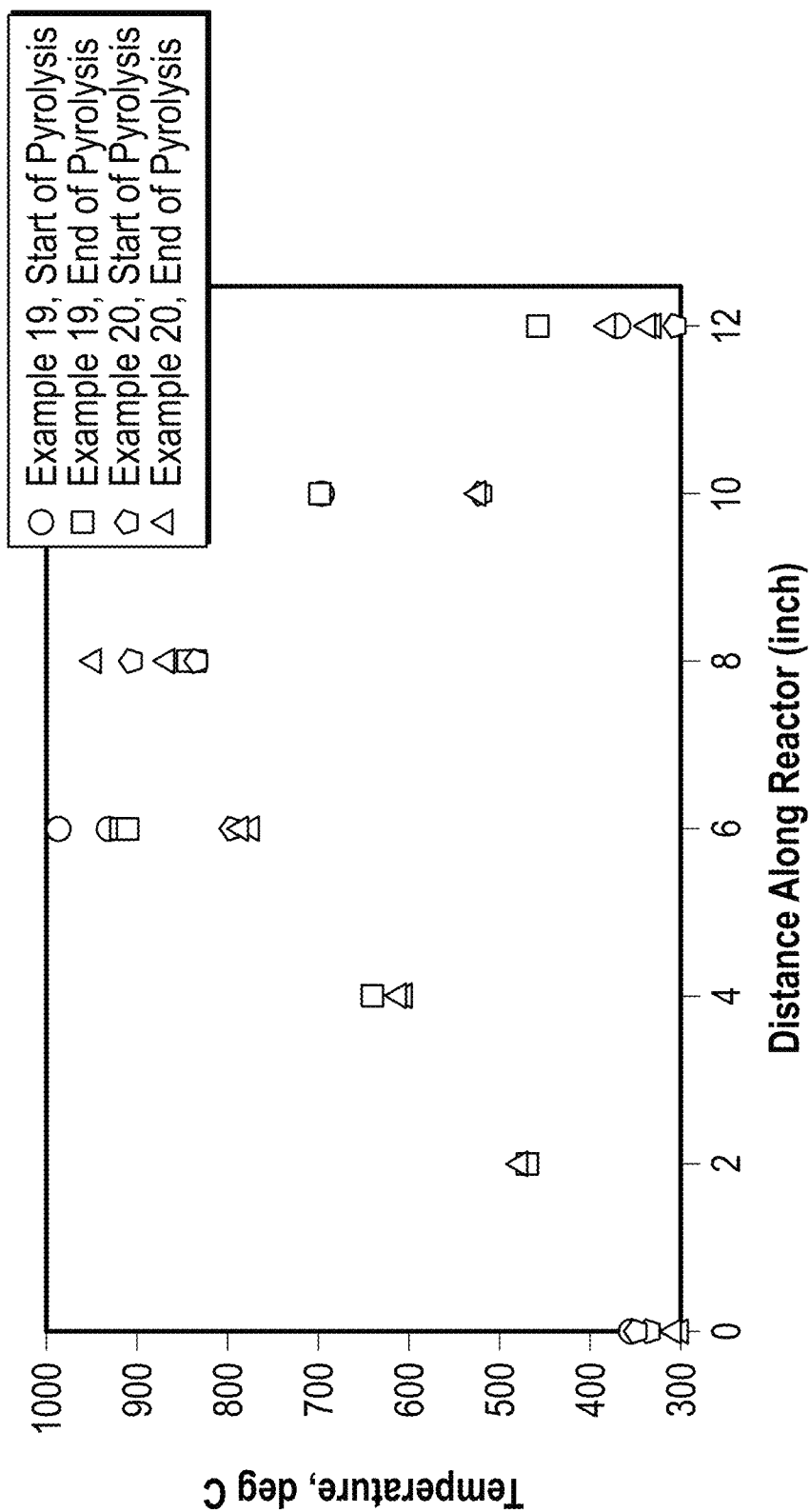
FIG. 16 shows the temperature profile for reactors during a cyclic pyrolysis process when using auto-combustion and catalytic combustion during the combustion step.

Although the cycle times are different, the above reaction cycles resulted in approximately the same amount of ethane conversion, roughly the same yield of ethylene, and similar yields of other products. As shown in FIG. 16, roughly the same temperature profile was also achieved within the reactor in both runs. This demonstrates that catalytic combustion of an auto-combustion resistant fuel can be used to form a temperature profile similar to a temperature profile based on auto-combustion. This indicates that the catalyst systems with a catalyst density gradient as described herein can be used to generate improved temperature profiles within a reactor during pyrolysis.

Example 21—Mitigation of Thermal Expansion of Particles

One convenient method for developing a catalyst density gradient is to use mixtures of catalyst particles and inert particles. One difficulty created by having thin layers of particles corresponding to different mixtures of catalyst particles and inert particles is that thermal expansion may cause mixing between the layers. Generally, it is desirable for the inert particles to have high heat capacity, as this can assist with storing heat in the reactor from combustion while minimizing the peak temperature. However, high heat capacity materials (such as alumina) can also tend to have relatively high thermal expansion coefficients. Due to the temperature swings during pyrolysis, the thermal expansion and contraction of particles can be large enough so that the expansion of a layer can correspond to a distance greater than the diameter of a single particle. The repeated expansion and contraction of layers could facilitate mixing of layers, thus modifying the catalyst density gradient.

In some aspects, mixing between layers can be reduced or minimized by organizing the particles in the reactor into small cells composed of a material with a low coefficient of thermal expansion. When loaded into the cells, the particles can be loaded so that a small amount of room remains within the cell. The particles can then expand into this additional room as the particles are heated and cooled. The walls of the cells allow the overall catalyst bed size to remain constant, since the walls of the cells are supporting the catalyst particles, rather than the layers of catalyst particles resting directly on top of one another.

Additional Embodiments

Embodiment 1. A method for performing pyrolysis, comprising: exposing a fuel stream comprising fuel and oxygen in a reactor to a catalyst system comprising a catalyst density gradient of combustion catalyst under combustion conditions to form a flue gas and to heat one or more surfaces in a reaction zone to a surface temperature of 750° C. or more, the one or more surfaces in the reaction zone comprising a peak temperature of 1000° C. or less, the fuel comprising 90 vol % $CH_4$ or more, the fuel stream flowing in the reactor in a first flow direction; and exposing a hydrocarbon-containing stream to the one or more surfaces in the reaction zone to pyrolyze at least a portion of the hydrocarbon-containing stream to form a pyrolyzed product, a flow direction of the hydrocarbon-containing stream comprising a second flow direction that is substantially opposite to the first flow direction, the pyrolyzed product optionally comprising ethylene.

Embodiment 2. The method of Embodiment 1, wherein the catalyst density gradient of combustion catalyst comprises at least a first portion of combustion catalyst having a first combustion catalyst density and second portion of combustion catalyst having a second combustion catalyst density that is greater than the first combustion catalyst density, the second portion of combustion catalyst being downstream from the first portion of combustion catalyst relative to the first flow direction, the second combustion catalyst density optionally being greater than the first combustion catalyst density by 50% or more relative to the first combustion catalyst density.

Embodiment 3. The method of any of the above embodiments, wherein the combustion conditions comprise initially exposing the fuel stream to the combustion catalyst at a temperature of 720° C. or more.

Embodiment 4. The method of any of the above embodiments, wherein the exposing a fuel stream to the catalyst system and the exposing a hydrocarbon-containing stream to the one or more surfaces comprises a reaction cycle, the reaction cycle comprising flowing one or more purge flows through the reactor.

Embodiment 5. The method of Embodiment 4, wherein the reaction cycle further comprises: exposing a second fuel stream comprising fuel and oxygen to the catalyst system under combustion conditions, the second flow stream comprising the second flow direction; and exposing a second hydrocarbon-containing stream to the one or more surfaces in the reaction zone to form a second pyrolyzed product, the second hydrocarbon-containing stream comprising the first flow direction, wherein the catalyst density gradient of combustion catalyst comprises at least a third portion of combustion catalyst having a third combustion catalyst density, the second combustion catalyst density being greater than the third combustion catalyst density, the second portion of combustion catalyst being downstream from the third portion of combustion catalyst relative to the second flow direction.

Embodiment 6. The method of any of the above embodiments, wherein the fuel comprises 95 vol % or more methane.

Embodiment 7. The method of any of the above embodiments, wherein the fuel is exposed to a temperature of 750° C. or more for 30 milliseconds or less prior to exposing the fuel to the catalyst system.

Embodiment 8. The method of any of the above embodiments, wherein the flue gas comprises 0.01 vol % or less of $CH_4$.

Embodiment 9. The method of any of the above embodiments, wherein the fuel stream comprises fuel and air, the air comprising 15 vol % or more $O_2$, the amount of $O_2$ being greater than a stoichiometric amount for combustion of the fuel by 1.0 vol % to 99 vol %, and wherein the fuel and air comprise 90 vol % or more of the fuel stream.

Embodiment 10. A reactor for performing cyclic reactions with flows entering the reactor from substantially opposing directions comprising: a first reactor inlet and a first reactor outlet; and a reaction zone comprising a catalyst system, the catalyst system comprising a catalyst density gradient of combustion catalyst, the catalyst density gradient of combustion catalyst comprising at least a first portion of combustion catalyst having a first combustion catalyst density and a second portion of combustion catalyst having a second combustion catalyst density, the second portion having a greater combustion catalyst density than the first portion of combustion catalyst, the first reactor inlet being closer to the first portion of combustion catalyst than the second portion of combustion catalyst.

Embodiment 11. The reactor of Embodiment 10, further comprising an additional portion of combustion catalyst having a greater combustion catalyst density than the second portion of combustion catalyst, the first reactor inlet being closer to the second portion of combustion catalyst than the additional portion of combustion catalyst.

Embodiment 12. The reactor of Embodiment 10 or 11, wherein i) the second combustion catalyst density is greater than the first combustion catalyst density by 50% or more relative to the first combustion catalyst density; ii) a combustion catalyst density of the additional portion of the combustion catalyst is greater than the first combustion catalyst density by 50% or more relative to the first combustion catalyst density; iii) a combustion catalyst density of the additional portion of the combustion catalyst is greater than the second combustion catalyst density by 50% or more relative to the first combustion catalyst density; or iv) a combination of two or more of i), ii), and iii).

Embodiment 13. The reactor of any of Embodiments 10 to 12, wherein the reactor further comprises a second reactor inlet; wherein the catalyst system further comprises a third portion of combustion catalyst having a third combustion catalyst density, the second portion of combustion catalyst being located between the first portion of combustion catalyst and the third portion of combustion catalyst, the second portion of combustion catalyst having a greater combustion catalyst density than the third portion of combustion catalyst; and wherein the second reactor inlet is closer to the third portion of combustion catalyst than the second portion of combustion catalyst.

Embodiment 14. The method of any of Embodiments 1 to 9 or the reactor of any of Embodiments 10 to 13, wherein the combustion catalyst comprises Mn, Y, Al, or a combination thereof.

Embodiment 15. The method of any of Embodiments 1 to 9 or the reactor of any of Embodiments 10 to 14, wherein the combustion catalyst comprises a supported catalyst, or wherein the catalyst system comprises supported combustion catalyst particles and second particles having a lower activity than the supported combustion catalyst particles, or a combination thereof.

Additional Embodiment A. A pyrolysis product made according to the method of any of Embodiments 1 to 9.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A reverse flow reactor for performing cyclic reactions with flows entering the reactor from substantially opposing directions comprising:
a first zone comprising a primary end, a secondary end, and at least a portion of a reaction zone, the at least a portion of the reaction zone being proximate to the secondary end of the first zone, the reaction zone comprising a catalyst system;
a second zone comprising a first end and a second end, the second zone comprising a recuperation zone proximate to the first end,
wherein the first zone and the second zone are in fluid communication, the second end of the second zone being proximate to the secondary end of the first zone,
wherein the catalyst system comprises a first portion of combustion catalyst having a first combustion catalyst density and a second portion of combustion catalyst having a second combustion catalyst density,
wherein the second combustion catalyst density is greater than the first combustion catalyst density, and
wherein the first end of the second zone is closer to the first portion of combustion catalyst than the second portion of combustion catalyst.

2. The reverse flow reactor of claim 1, wherein the catalyst system further comprises an additional portion of combustion catalyst having a greater combustion catalyst density than the second portion of combustion catalyst, the first end of the second zone being closer to the second portion of combustion catalyst than the additional portion of combustion catalyst.

3. The reverse flow reactor of claim 1, wherein the catalyst system further comprises a third portion of combustion catalyst having a third combustion catalyst density, the second portion of combustion catalyst being located between the first portion of combustion catalyst and the third portion of combustion catalyst, the second portion of combustion catalyst having a greater combustion catalyst density than the third portion of combustion catalyst; and wherein the primary end of the first zone is closer to the third portion of combustion catalyst than the second portion of combustion catalyst.

4. The reverse flow reactor of claim 1, wherein the combustion catalyst comprises Mn, Y, Al, or a combination thereof.

5. The reverse flow reactor of claim 1, wherein (i) the combustion catalyst comprises a supported catalyst, (ii) the catalyst system comprises supported combustion catalyst particles and second particles having a lower activity than the supported combustion catalyst particles, or (iii) a combination thereof.

6. The reverse flow reactor of claim 1, wherein the second combustion catalyst density is greater than the first combustion catalyst density by 50% or more relative to the first combustion catalyst density.

7. The reverse flow reactor of claim 1, wherein the second zone comprises a second portion of the reaction zone.

8. A method for performing pyrolysis, comprising:
exposing a fuel stream comprising fuel and oxygen in a reactor to a catalyst system comprising a catalyst density gradient of combustion catalyst under combustion conditions to form a flue gas and to heat one or more surfaces in a reaction zone to a surface temperature of 750° C. or more, the one or more surfaces in the reaction zone comprising a peak temperature of 1000° C. or less, the fuel comprising 90 vol % or more $CH_4$, the fuel stream flowing in the reactor in a first flow direction; and
exposing a hydrocarbon-containing stream to the one or more surfaces in the reaction zone to pyrolyze at least a portion of the hydrocarbon-containing stream to form a pyrolyzed product, a flow direction of the hydrocarbon-containing stream comprising a second flow direction that is substantially opposite to the first flow direction,
wherein the reactor comprises a reverse flow reactor for performing cyclic reactions with flows entering the reactor from substantially opposing directions comprising:

a first zone comprising a primary end, a secondary end, and at least a portion of the reaction zone, the at least a portion of the reaction zone being proximate to the secondary end of the first zone, the reaction zone comprising the catalyst system;

a second zone comprising a first end and a second end, the second zone comprising a recuperation zone proximate to the first end, wherein the first zone and the second zone are in fluid communication, the second end of the second zone being proximate to the secondary end of the first zone, wherein the catalyst system comprises a first portion of combustion catalyst having a first combustion catalyst density and a second portion of combustion catalyst having a second combustion catalyst density, wherein the second combustion catalyst density is greater than the first combustion catalyst density, and wherein the first end of the second zone is closer to the first portion of combustion catalyst than the second portion of combustion catalyst.

9. The method of claim 8, wherein the second combustion catalyst density is greater than the first combustion catalyst density by 50% or more relative to the first combustion catalyst density.

10. The method of claim 8, wherein the combustion conditions comprise initially exposing the fuel stream to the combustion catalyst at a temperature of 720° C. or more.

11. The method of claim 8, wherein the exposing a fuel stream to the catalyst system and the exposing a hydrocarbon-containing stream to the one or more surfaces comprises a reaction cycle, the reaction cycle comprising flowing one or more purge flows through the reactor.

12. The method of claim 11, wherein the reaction cycle further comprises:

exposing a second fuel stream comprising fuel and oxygen to the catalyst system under combustion conditions, the second flow stream comprising the second flow direction; and exposing a second hydrocarbon-containing stream to the one or more surfaces in the reaction zone to form a second pyrolyzed product, the second hydrocarbon-containing stream comprising the first flow direction.

13. The method of claim 12, wherein the catalyst density gradient of combustion catalyst comprises at least a third portion of combustion catalyst having a third combustion catalyst density, the second combustion catalyst density being greater than the third combustion catalyst density, the second portion of combustion catalyst being downstream from the third portion of combustion catalyst relative to the second flow direction.

14. The method of claim 1, wherein the fuel comprises 95 vol % or more $CH_4$.

15. The method of claim 8, wherein the fuel is exposed to a temperature of 750° C. or more for 30 milliseconds or less prior to exposing the fuel to the catalyst system.

16. The method of claim 8, wherein the pyrolyzed product comprises ethylene.

17. The method of claim 8, wherein the combustion catalyst comprises Mn, Y, Al, or a combination thereof.

18. The method of claim 8, wherein (i) the combustion catalyst comprises a supported catalyst, (ii) the catalyst system comprises supported combustion catalyst particles and second particles having a lower activity than the supported combustion catalyst particles, or (iii) a combination thereof.

19. The method of claim 8, wherein the flue gas comprises 0.01 vol % or less of $CH_4$.

20. The method of claim 8, wherein the fuel stream comprises fuel and air, the air comprising 15 vol % or more $O_2$, the amount of $O_2$ being greater than a stoichiometric amount for combustion of the fuel by 1.0 vol % to 99 vol %, and wherein the fuel and air comprise 90 vol % or more of the fuel stream.

* * * * *